United States Patent
Canonne-Velasquez et al.

(10) Patent No.: US 12,295,037 B2
(45) Date of Patent: May 6, 2025

(54) METHODS AND APPARATUS FOR MSG-A TRANSMISSION IN TWO-STEP RACH

(71) Applicant: INTERDIGITAL PATENT HOLDINGS, INC., Wilmington, DE (US)

(72) Inventors: Loic Canonne-Velasquez, Dorval (CA); Afshin Haghighat, Ile-Bizard (CA); Shahrokh Nayeb Nazar, San Diego, CA (US); J. Patrick Tooher, Montreal (CA)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 513 days.

(21) Appl. No.: 17/430,885

(22) PCT Filed: Feb. 11, 2020

(86) PCT No.: PCT/US2020/017706
§ 371 (c)(1),
(2) Date: Aug. 13, 2021

(87) PCT Pub. No.: WO2020/167794
PCT Pub. Date: Aug. 20, 2020

(65) Prior Publication Data
US 2022/0086915 A1   Mar. 17, 2022

Related U.S. Application Data

(60) Provisional application No. 62/908,878, filed on Oct. 1, 2019, provisional application No. 62/840,698, filed
(Continued)

(51) Int. Cl.
*H04W 74/08* (2024.01)
*H04W 74/00* (2009.01)
*H04W 74/0833* (2024.01)

(52) U.S. Cl.
CPC ..... *H04W 74/0833* (2013.01); *H04W 74/006* (2013.01)

(58) Field of Classification Search
CPC .............. H04B 7/0695; H04W 74/006; H04W 74/0833
See application file for complete search history.

(56) References Cited

U.S. PATENT DOCUMENTS

| 10,382,978 B2 | 8/2019 | Lee et al. |
| 2013/0148593 A1* | 6/2013 | Suzuki ................. H04L 5/0091 370/329 |

(Continued)

FOREIGN PATENT DOCUMENTS

| CN | 108668361 A | 10/2018 |
| WO | 2016073039 A1 | 5/2016 |

(Continued)

OTHER PUBLICATIONS

Ericsson, "Channel Structure for Two-Step RACH," 3GPP TSG-RAN WG1 Meeting #98, R1-1909122, Prague, CZ (Aug. 26-30, 2019).

(Continued)

*Primary Examiner* — Mansour Oveissi
(74) *Attorney, Agent, or Firm* — Volpe Koenig

(57) ABSTRACT

Methods and apparatus for beam refinement are disclosed. A wireless transmit/receive unit (WTRU) may be configured to receive configuration information. The configuration information may indicate an association between preambles, synchronization signal blocks (SSBs), reference signal (RS) sets, and physical uplink shared channel (PUSCH) resources. The WTRU may be configured to receive a plurality of SSBs, determine a measurement of the received SSBs, and select an SSB based on the determined measurement. The WTRU may be configured to select and transmit a preamble using a first beam. The WTRU may be config- (Continued)

US 12,295,037 B2
Page 2 ured to receive a plurality of sets of RSs based on the transmitted preamble and determine a measurement of the received sets of RSs. The WTRU may be configured to select a RS based on the determined measurement of the received sets of RSs. The WTRU may be configured to transmit uplink data on a PUSCH using a second beam.

18 Claims, 12 Drawing Sheets

Related U.S. Application Data on Apr. 30, 2019, provisional application No. 62/824,715, filed on Mar. 27, 2019, provisional application No. 62/805,079, filed on Feb. 13, 2019.

(56) References Cited

U.S. PATENT DOCUMENTS

| | | | |
|---|---|---|---|
| 2017/0019930 A1* | 1/2017 | Lee | H04W 72/21 |
| 2018/0146498 A1 | 5/2018 | Sahlin et al. | |
| 2018/0324863 A1 | 11/2018 | Akoum et al. | |
| 2020/0045650 A1 | 2/2020 | Suzuki et al. | |
| 2020/0053571 A1* | 2/2020 | Tsai | H04W 74/0808 |
| 2020/0112984 A1* | 4/2020 | Islam | H04L 5/001 |
| 2021/0337597 A1 | 10/2021 | Yoshimura et al. | |
| 2021/0345420 A1 | 11/2021 | Chen et al. | |
| 2022/0070944 A1* | 3/2022 | Lin | H04W 74/006 |

FOREIGN PATENT DOCUMENTS

| | | |
|---|---|---|
| WO | 2017151187 A1 | 9/2017 |
| WO | 2018111461 A1 | 6/2018 |

OTHER PUBLICATIONS

Ericsson, "Introduction of two-step RACH," 3GPP TSG-RAN WG1 Meeting #99, R1-1913174, Reno, NV, USA (Nov. 18-22, 2019).
Ericsson, "Procedure for Two-step RACH," 3GPP TSG-RAN WG1 Meeting #98, R1-1909123, Prague, CZ (Aug. 26-30, 2019).
Huawei et al., "Discussion on channel structure of 2-step RACH," 3GPP TSG-RAN WG1 Meeting #98, R1-1908033, Prague, CZ (Aug. 26-30, 2019).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).
Intel Corporation, "Discussion on channel structure for 2-step RACH," 3GPP TSG-RAN WG1 Meeting #98, R1-1908618, Prague, CZ (Aug. 26-30, 2019).
Interdigital Inc., "Discussion on Procedures for Two-Step RACH," 3GPP TSG RAN WG1 Meeting #96b, R1-1904850, Xi'an, China (Apr. 8-12, 2019).
Interdigital Inc., "On 2-step RACH procedure," 3GPP TSG RAN WG1 Meeting #97, R1-1906859, Reno, USA (May 13-17, 2019).
Interdigital Inc., "Views on 2-step RACH procedures," 3GPP TSG-RAN WG1 Meeting #98, R1-1908231, Prague, CZ (Aug. 26-30, 2019).
Nokia et al., "On 2-step RACH Channel Structure," 3GPP TSG RAN WG1 #97, R1-1906746, Reno, USA (May 13-17, 2019).
Nokia et al., "On 2-step Random Access Procedure," 3GPP TSG RAN WG1 Ad-Hoc Meeting 1901, R1-1901192, Taipei, Taiwan (Jan. 21-25, 2019).
Qualcomm Incorporated, "Channel Structure for Two-Step RACH," 3GPP TSG-RAN WG1 Meeting #98, R1-1909239, Prague, CZ (Aug. 26-30, 2019).
Samsung, "Channel Structure for Two-Step RACH," 3GPP TSG-RAN WG1 Meeting #98, R1-1908459, Prague, CZ (Aug. 26-30, 2019).
Third Generation Partnership Project, "Technical Specification Group Radio Access Network; NR; Physical channels and modulation (Release 15)," 3GPP TS 38.211 V15.4.0 (Dec. 2018).
Third Generation Partnership Project, "Technical Specification Group Radio Access Network; NR; Physical layer procedures for control (Release 15)," 3GPP TS 38.213 V15.8.0 (Dec. 2019).
Third Generation Partnership Project, "Technical Specification Group Radio Access Network; NR; Physical layer procedures for control (Release 15)," 3GPP TS 38.213 V16.0.0 (Dec. 2019).
Third Generation Partnership Project, "Technical Specification Group Radio Access Network; NR; Physical layer procedures for control (Release 15)," 3GPP TS 38.213 V15.4.0 (Dec. 2018).
Third Generation Partnership Project, "Technical Specification Group Radio Access Network; NR; Medium Access Control (MAC) protocol specification (Release 15)," 3GPP TS 38.321 V15.4.0 (Dec. 2018).
Third Generation Partnership Project, "Technical Specification Group Radio Access Network; NR; Medium Access Control (MAC) protocol specification (Release 15)," 3GPP TS 38.321 V15.8.0 (Dec. 2019).
Third Generation Partnership Project, "Technical Specification Group Radio Access Network NR Radio Resource Control (RRC) protocol specification (Release 15)," 3GPP TS 38.331 V15.8.0 (Dec. 2019).
Third Generation Partnership Project, "Technical Specification Group Radio Access Network NR Radio Resource Control (RRC) protocol specification (Release 15)," 3GPP TS 38.331 V15.4.0 (Dec. 2018).
Third Generation Partnership Project, "Technical Specification Group Radio Access Network; NR; Physical channels and modulation (Release 15)," 3GPP TS 38.211 V15.8.0 (Dec. 2019).
Third Generation Partnership Project, "Technical Specification Group Radio Access Network; NR; Physical channels and modulation (Release 16)," 3GPP TS 38.211 V16.0.0 (Dec. 2019).
ZTE et al., "On the remaining issues of msgA channel structure," 3GPP TSG-RAN WG1 Meeting #98, R1-1908181, Prague, CZ (Aug. 26-30, 2019).

* cited by examiner

METHODS AND APPARATUS FOR MSG-A TRANSMISSION IN TWO-STEP RACH

CROSS-REFERENCE TO RELATED APPLICATIONS

This application is the U.S. National Stage, under 35 U.S.C. § 371, of International Application No. PCT/US2020/017706, filed Feb. 11, 2020, which claims the benefit of U.S. Provisional Application No. 62/805,079, filed Feb. 13, 2019; U.S. Provisional Application No. 62/824,715, filed Mar. 27, 2019; U.S. Provisional Application No. 62/840,698, filed Apr. 30, 2019; and U.S. Provisional Application No. 62/908,878, filed Oct. 1, 2019, the contents of which are incorporated herein by reference.

BACKGROUND

In release 15 of New Radio (NR), a 4-step random access channel (RACH) procedure is supported on the uplink. There are several triggers that initiate a RACH procedure such as synchronization acquisition and handover. A 2-step RACH procedure is being studied as an alternative to the 4-step RACH procedure and the 2-step RACH may be used in cases such as those which require low latency. At the RAN plenary #82, NR approved a working item for contention based 2-step RACH.

SUMMARY

Methods and apparatus for beam refinement are disclosed. In an embodiment, a wireless transmit/receive unit (WTRU) may be configured to receive configuration information. The configuration information may indicate an association between preambles and synchronization signal blocks (SSBs). The configuration information may indicate an association between preambles, reference signal (RS) sets, and physical uplink shared channel (PUSCH) resources. The WTRU may be configured to receive a plurality of SSBs. The WTRU may be configured to determine a measurement of the received SSBs. The WTRU may be configured to select an SSB based on the determined measurement of the received SSBs. The WTRU may be configured to select a preamble. The WTRU may be configured to transmit the selected preamble using a first beam. The WTRU may be configured to receive a plurality of sets of RSs based on the transmitted preamble. The WTRU may be configured to determine a measurement of the received sets of RSs. The WTRU may be configured to select a RS based on the determined measurement of the received sets of RSs. The WTRU may be configured to transmit uplink data on a PUSCH using a second beam. Each SSB may correspond to a beam. An SSB with a highest reference signal received power (RSRP) may be selected. The preamble selected may be a preamble that is associated with the selected SSB. The PUSCH transmission may be scrambled with a WTRU-identity. The WTRU-identity may be based on a common random access-radio network temporary identifier (RA-RNTI) and a preamble index. The WTRU may be configured to determine resources for receiving the plurality of sets of RSs in response to the transmitted preamble. The plurality of RS sets received may be associated with the transmitted preamble.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
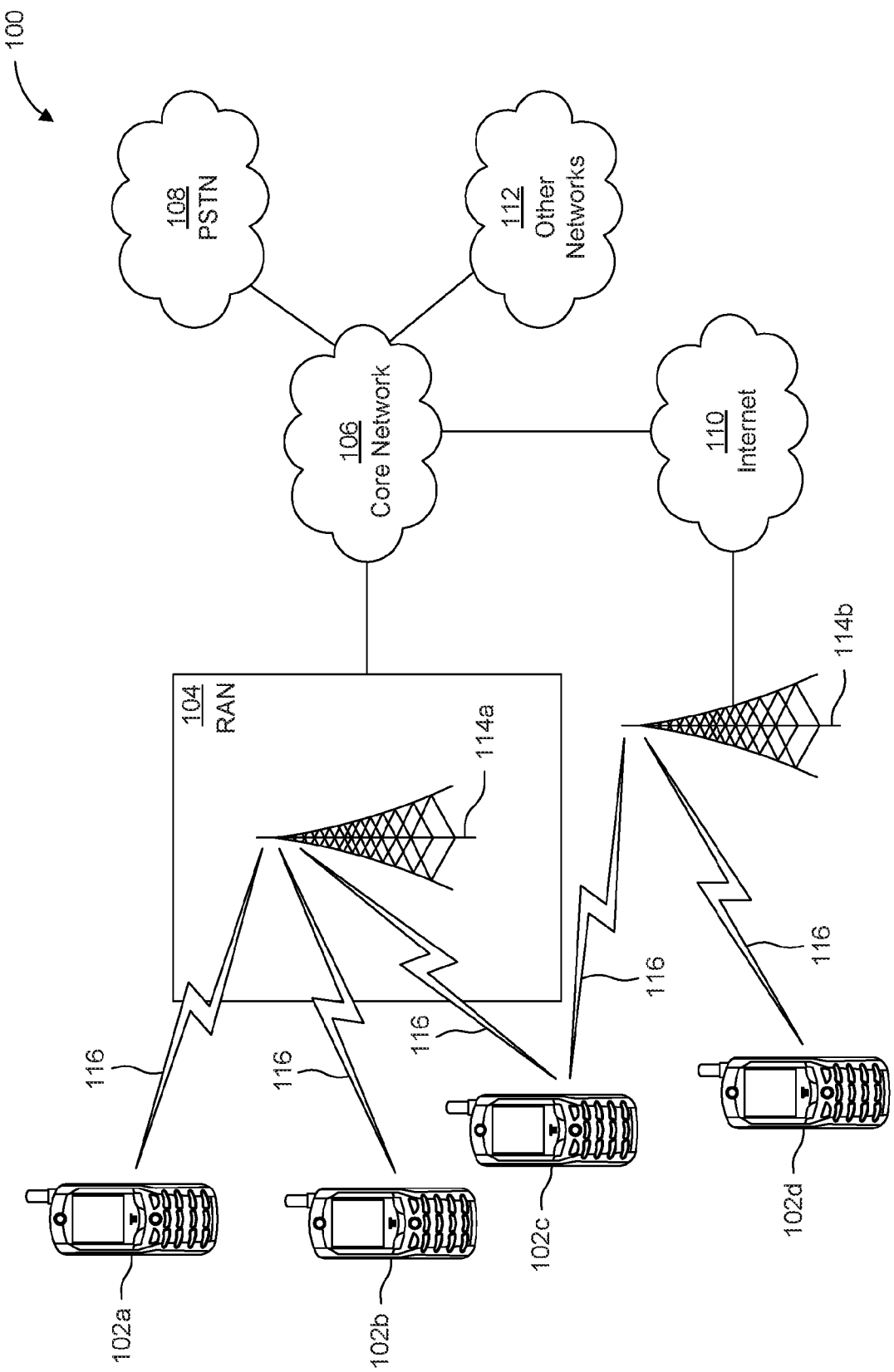
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
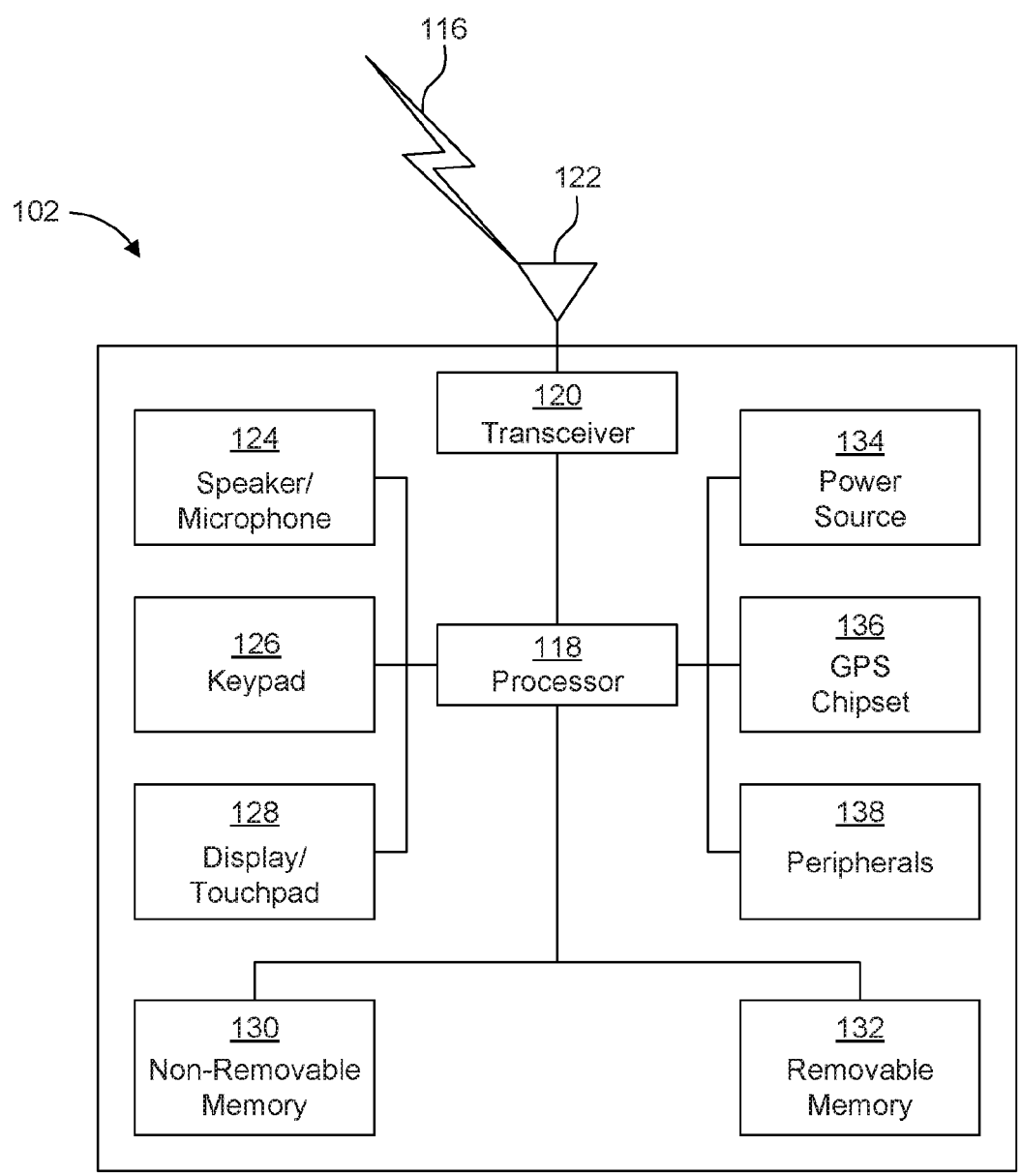
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
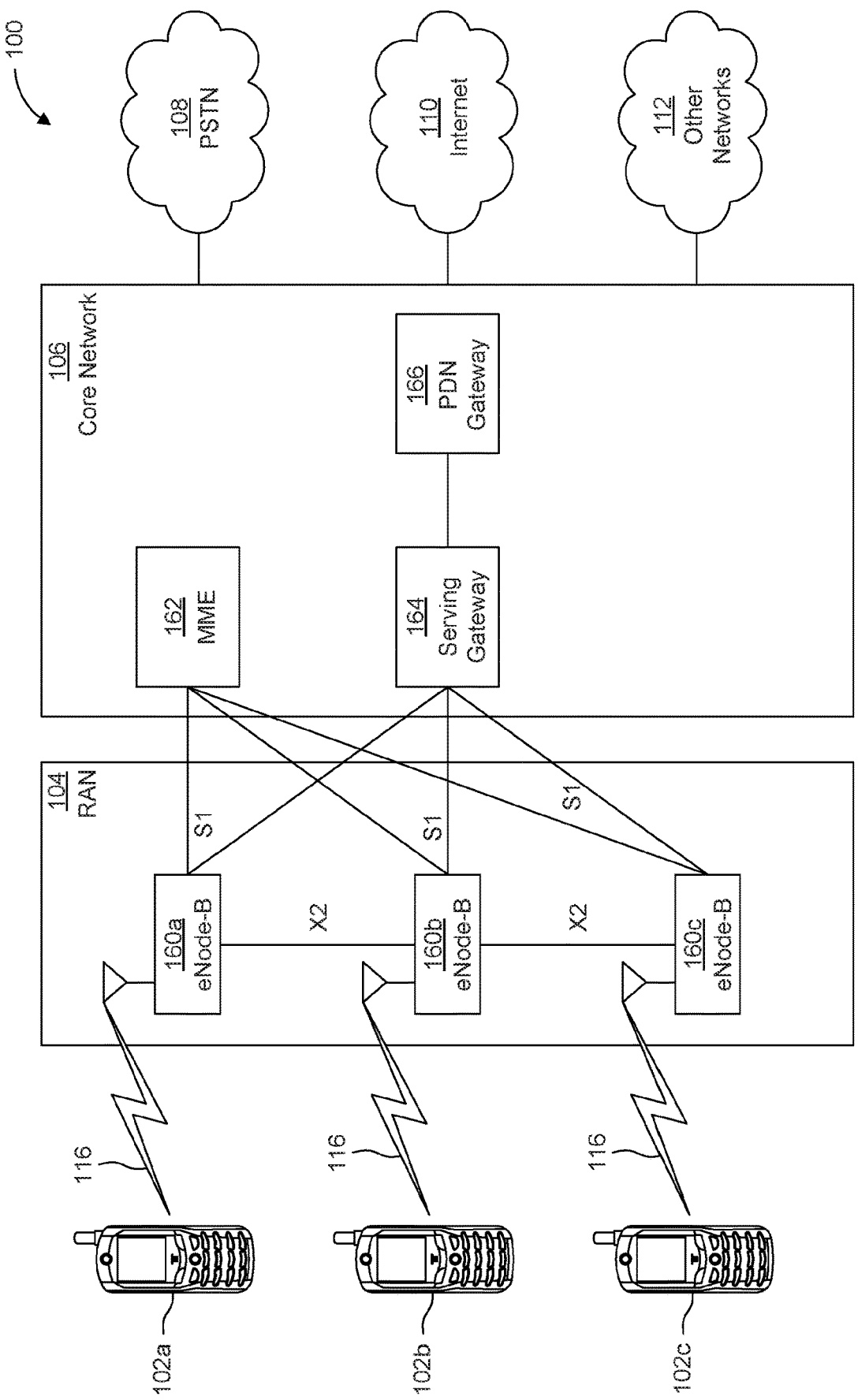
FIG. 1O is a system diagram illustrating an example radio access network (RAN) and an example core network (CN) that may be used within the communications system illustrated in FIG. 1A according to an embodiment.
FIG. 1D is a system diagram illustrating a further example RAN and a further example CN that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Figure 10:
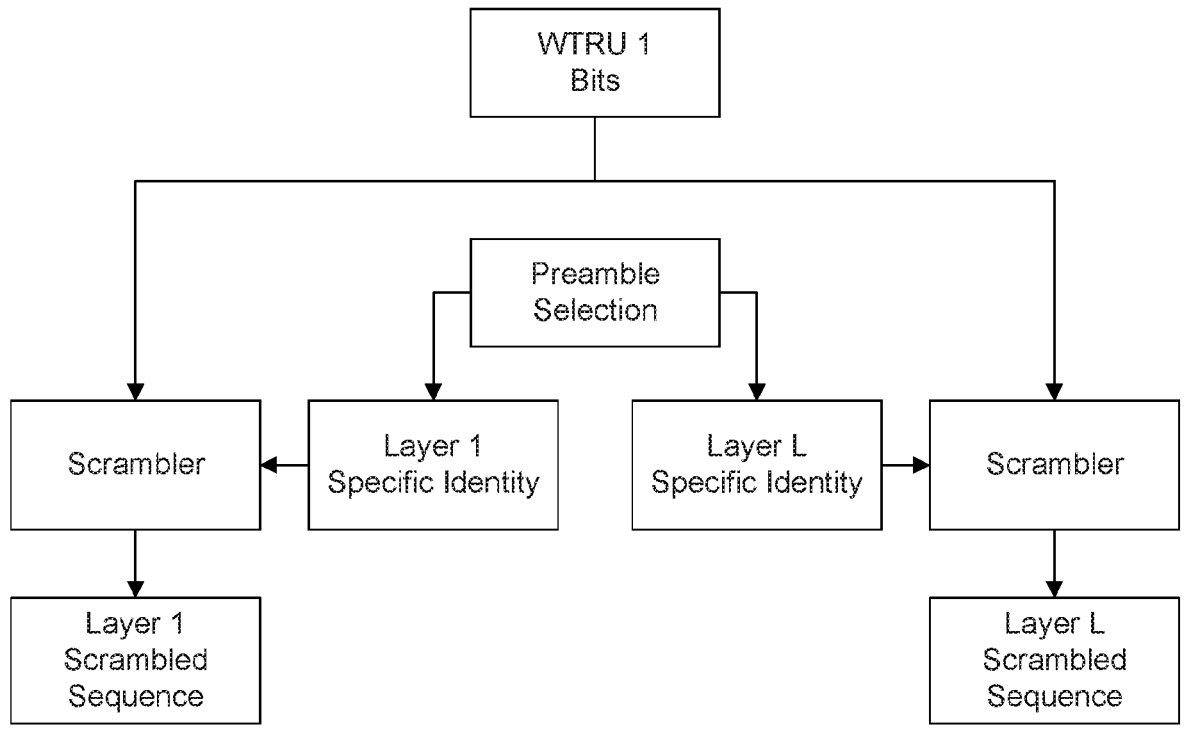
FIG. 10 is an example of multilayer transmission.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
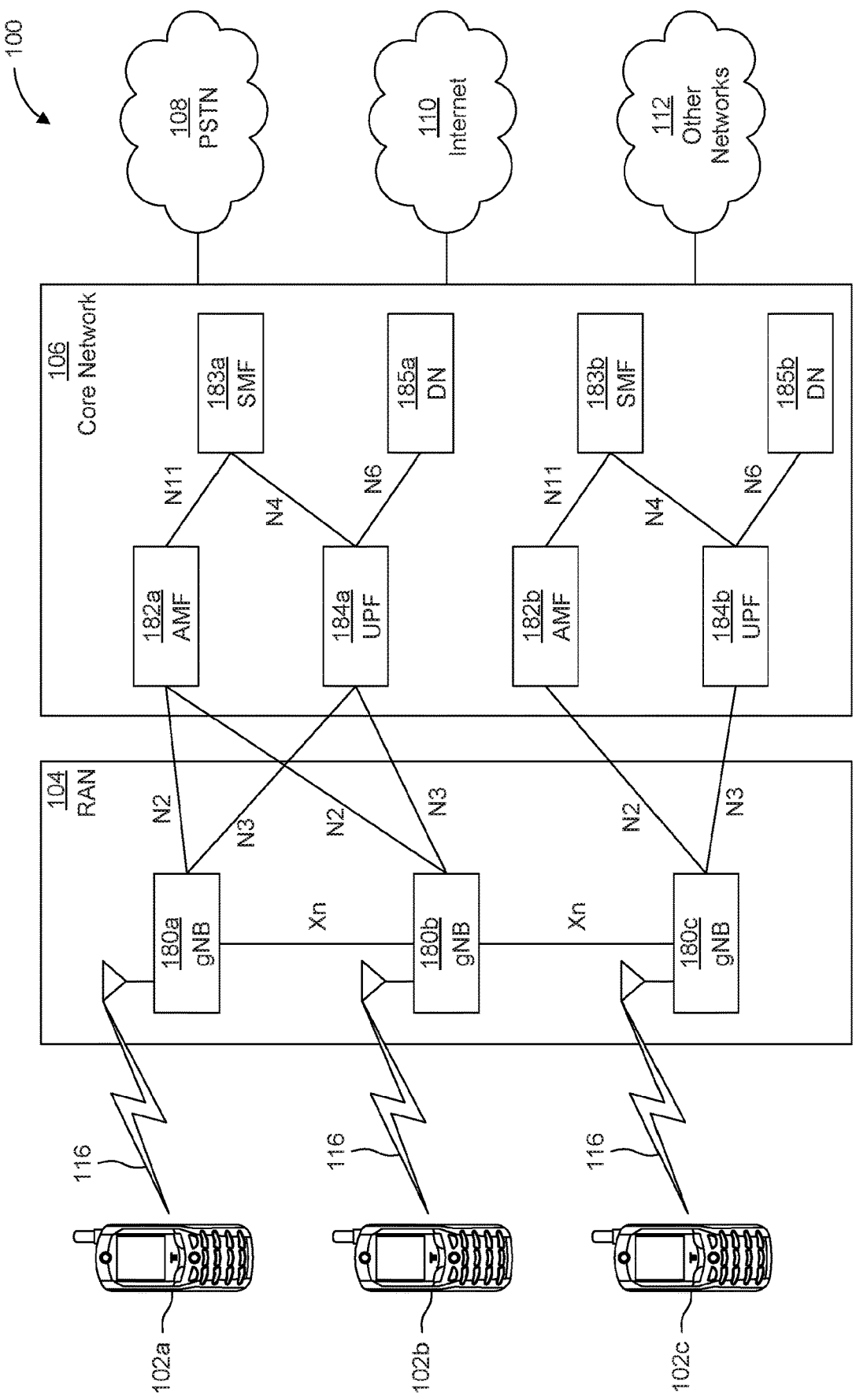

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be P-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Figure 2:
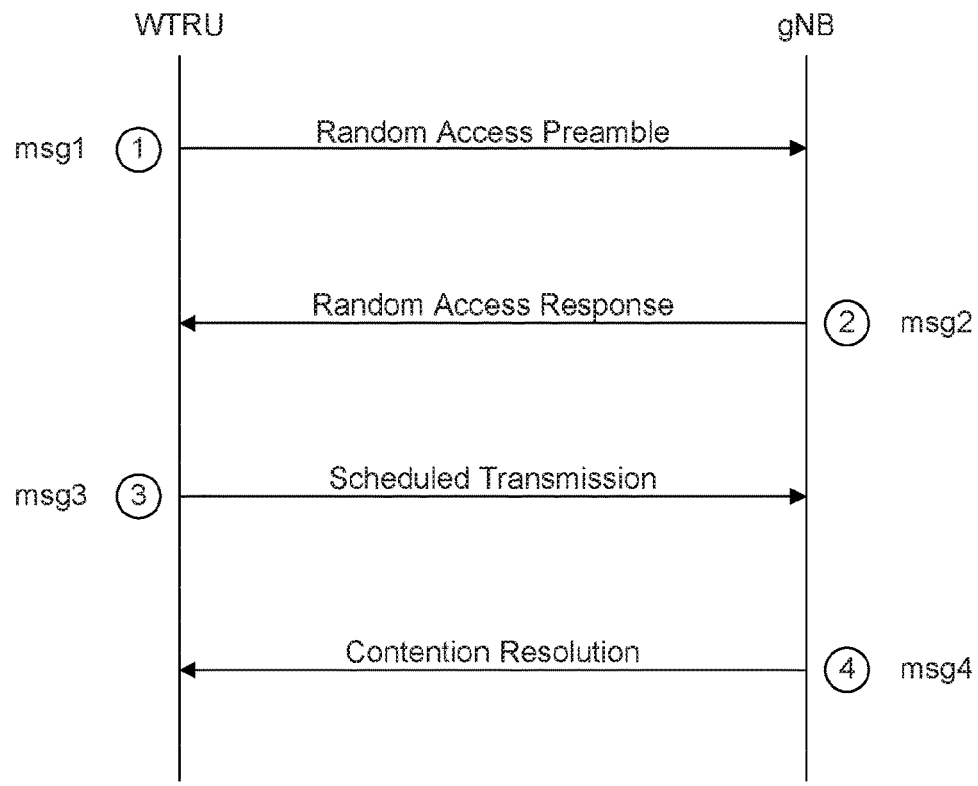
FIG. 2 is an example information exchange for a 4-step RACH procedure.

FIG. 2 is an example information exchange between a WTRU and a gNB for a 4-step RACH procedure. The WTRU may send a first message (e.g. msg1) which may be a randomly selected random access preamble sequence. The first message may be sent during a PRACH opportunity. The gNB may receive the first message and may reply with a second message (e.g. msg2). The second message may be or comprise a random access response (RAR). The RAR may comprise a DCI. The DCI may be scrambled with a RA-RNTI corresponding to the PRACH occasion in which the preamble is sent. The DCI may contain a RAR grant. The RAR grant may comprise a time and frequency resource allocation for the WTRU. The RAR grant may comprise a modulation and coding scheme (MCS) and a transmit power control (TPC) command. The second message may contain a preamble index so that the WTRU may confirm the RAR is intended for the WTRU. The WTRU may monitor a control channel for the second message and decode it. The WTRU may scramble data with a TC-RNTI. The WTRU may send a third message (e.g. msg3). The third message may comprise a payload of the scrambled data. The third message may be sent according to scheduled resources provided in the RAR grant. The gNB may reply with a fourth message (e.g. msg4). The fourth message may be a contention resolution message. Upon reception of the fourth message, the WTRU may compare its TC-RNTI sent in the third message with the WTRU identity received in the fourth message. Contention may occur when two WTRUs select the same preamble because it may cause them to monitor the same RAR grant which may lead the WTRUs to send a third message on the same resources. In the event of a collision, a WTRU may attempt another RACH procedure. The WTRU may send an acknowledgment message to indicate successful reception of the fourth message.

Figure 3:
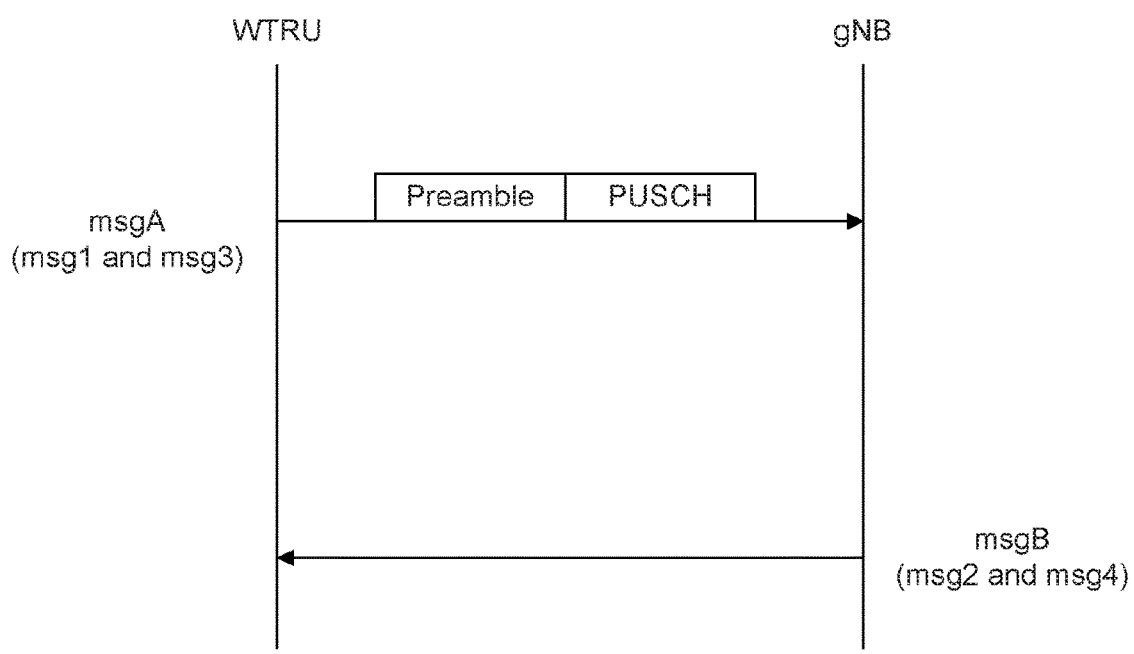
FIG. 3 is an example information exchange for a 2-step RACH procedure.

FIG. 3 is an example information exchange between a WTRU and a gNB for a 2-step RACH procedure. In a 2-step RACH procedure, msg1 (e.g. a preamble) and msg3 (e.g. a payload) may be sent together in a first transmission (e.g. msgA). The preamble and the payload may be time division multiplexed. The payload may be transmitted on a channel such as a Rel-15 NR PUSCH using a Rel-15 NR demodulation reference signal (DMRS). The PRACH preamble sequences may be reused from Rel-15 NR. In the 2-step RACH procedure, msg2 and msg4 may be combined into a second message (e.g. msgB). An acknowledgement (ACK) or a negative acknowledgement (NACK) may be included in msgB and may indicate feedback for the preamble, PUSCH payload, and/or contention resolution.

In 2-step RACH, the payload may be transmitted before receiving a resource assignment (e.g. grant) from a gNB. This may lead to a collision of payloads if WTRUs decide to transmit on the same set of resources. At the receiving end, the gNB may need to know the transmission configuration used by a WTRU to decode msgA. Therefore, assuming a signal structure for msgA comprising of a preamble and a PUSCH payload, the following issues may need to be addressed: (i) preamble and PUSCH resource mapping to reduce the probability of collision; (ii) how a WTRU based on preamble transmission may enable non-orthogonal multiple access (NOMA) detection at a gNB; (iii) how a WTRU determines a transmission configuration and indicates it to a gNB; and (iv) link adaption and power control mechanism for preamble and PUSCH.

Described herein, a reference symbol may be used to denote a symbol such as a complex number that is fixed and known and used as a pilot. A reference signal may be used to denote a time domain signal that is generated after processing the reference symbols. For example, in OFDM, reference symbols are the complex numbers that are fed into an IDFT block while a reference signal is the output of the IDFT block. Downlink control information (DCI) is a set of bits that may be transmitted over a PDCCH for a user or a group of users. A resource element (RE) may be one OFDM symbol on one subcarrier, and a resource element group (REG) may refer to a group of REs which may be used as building blocks of control channel element (CCE) which may assign resource elements to a user. Adjacent REGs in time or frequency that are grouped together and their associated precoder is the same are called REG bundles. NR-REG, NR-CCE, and NR-PDCCH may refer to REG, CCE, and PDCCH for the new radio (NR) in 5G. UE and user may be used interchangeably. gNodeB and gNB may be used interchangeably. A control resource set (CORESET) may be a set of resource elements used for a downlink control channel, configured by its frequency resources and its length in time (in terms of symbols) and the type of its REG bundles. A search space, or a set of search spaces, may be a set of PDCCH candidates that are monitored by a UE or a group of UEs during blind detection of a PDCCH.

In Rel-15 NR, a WTRU may initiate a PRACH transmission by randomly selecting a preamble from a list of configured preambles. The configuration may be communicated to the WTRU through a SIB during initial access. In 2-step RACH, a PUSCH transmission may occur without receiving an uplink scheduling grant in a DCI to schedule on which resources the transmission may occur and with which transmission parameters. The content of the scheduling grant may be inferred by the selection of the preamble.

In an embodiment for 2-step RACH, a WTRU may implicitly signal to a gNB additional information about the payload (PUSCH) portion of msgA's transmission by its choice of preamble. The following may be implicit details that may be inferred at a gNB: PUSCH resources; WTRU-ID; MCS; DMRS indices, and beam indices. For example, one preamble may be linked to a set of parameters. A WTRU may randomly select a preamble and transmit the preamble using the specified parameters. The gNB may detect a preamble index and based on the preamble index the gNB may implicitly determine that the transmission from the WTRU is performed using the specified parameters linked to the preamble. For example, if a WTRU selects preamble 1, then it may transmit on PRB1 with MCS1 and using DMRS1. A WTRU-ID may also be associated with a preamble set partition.

Figure 4A:
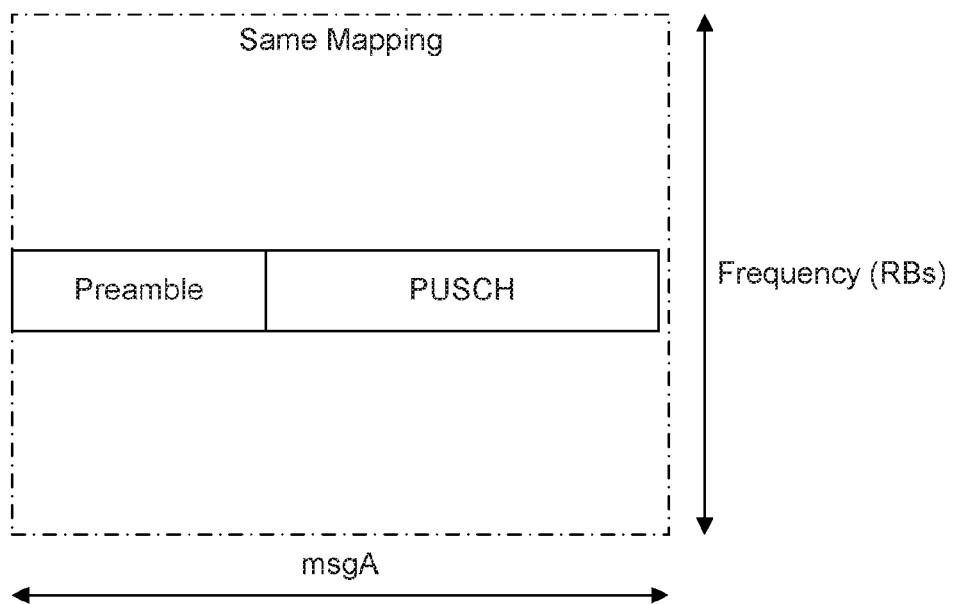
FIG. 4A is an example of a same mapping between preamble and PUSCH resources.
Figure 4B:
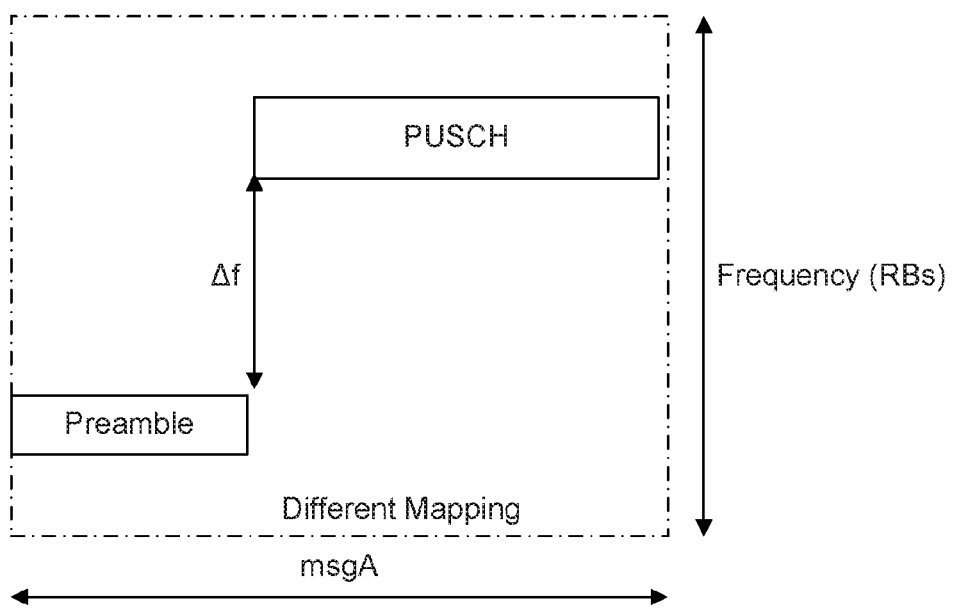
FIG. 4B is an example of a different mapping between preamble and PUSCH resources.

Transmission of msgA may involve transmission of a preamble and a payload (PUSCH). FIG. 4A shows an example of a same mapping of preamble and PUSCH resources. In FIG. 4A the preamble resources are in a same frequency (e.g. same resource blocks (RBs)) as the PUSCH resources. The mapping of PUSCH resources may not occur in a same resource block range as preamble resources. FIG. 4B shows an example of a different mapping of preamble and PUSCH resources. In FIG. 4B the preamble resources are in a different frequency (e.g. same resource blocks (RBs)) as the PUSCH resources. The mapping of PUSCH resources may be independent of or a function of preamble resources in frequency and/or time.

In an embodiment, a WTRU may apply a frequency offset difference, which may be a fixed frequency offset difference, between a resource mapping of the preamble and a resource mapping of PUSCH resources. The frequency offset value ($\Delta f$) may be configured or reconfigured through a dynamic or a semi-static process. In an embodiment, a WTRU may apply a time varying frequency offset based on a pattern known to a gNB. The pattern may be preconfigured, or it may be based on one or more system parameters (e.g., symbol number, RB index, WTRU identity, type of RNTI).

A WTRU may be configured with one or more preambles and PUSCH resources for 2-Step RACH. Despite having different preambles, msgA payloads of different WTRUs may collide during the 2-Step RACH procedure. The relationship between the preamble and PUSCH resources may be fixed, semi-statically configured during initial access, or dynamically reconfigured.

The configured preamble and PUSCH resources may be linked such that by selection of a preamble, a WTRU may be able to select from a subset of the available PUSCH resources. A WTRU may implicitly indicate to a gNB some information for detection of a transmitted payload in a PUSCH. In an embodiment, a preamble may be associated with more than one set of PUSCH resources where each set of PUSCH resources may comprise of one or multiple PRBs.

A subset of PUSCH resources may be configured to be associated with one preamble. A WTRU may randomly select a preamble and the WTRU may randomly select one PUSCH resource from a partition associated with the preamble. If multiple WTRUs select the same preamble, they may each be able to transmit on one of the randomly selected resources from the configured partition. Through transmission of the preamble, a WTRU may indicate to the gNB the subset of interest for detection. The gNB may detect the preamble and may search through the associated PUSCH resources to decode the WTRUs.

In an embodiment, a preamble may be associated with multiple subsets of PUSCH resources where selection of a subset of PUSCH resources may be based on another system parameter or measurement. For example, selection of a subset of PUSCH resources may be based on the on a packet size, a service type, an expected reliability or delay, a bandwidth part, or an estimated pathloss.

In an embodiment, a WTRU may be configured with multiple subsets of PUSCH resources where selection of a subset of PUSCH resources may not be linked to a specific preamble. Selection of a subset of PUSCH resources may be based on another system parameter or measurement.

A WTRU may be configured with multiple PUSCH resources where each set of PUSCH resources may comprise of one or multiple PRBs. The PUSCH resources may follow a contiguous or a non-contiguous mapping. A WTRU may be configured to transmit its payload using more than one set of PUSCH resources for enhanced reliability as well as demonstrating robustness to potential collisions. The additional PUSCH resources may be the same or different than a size of the original PUSCH resource.

Figure 5:
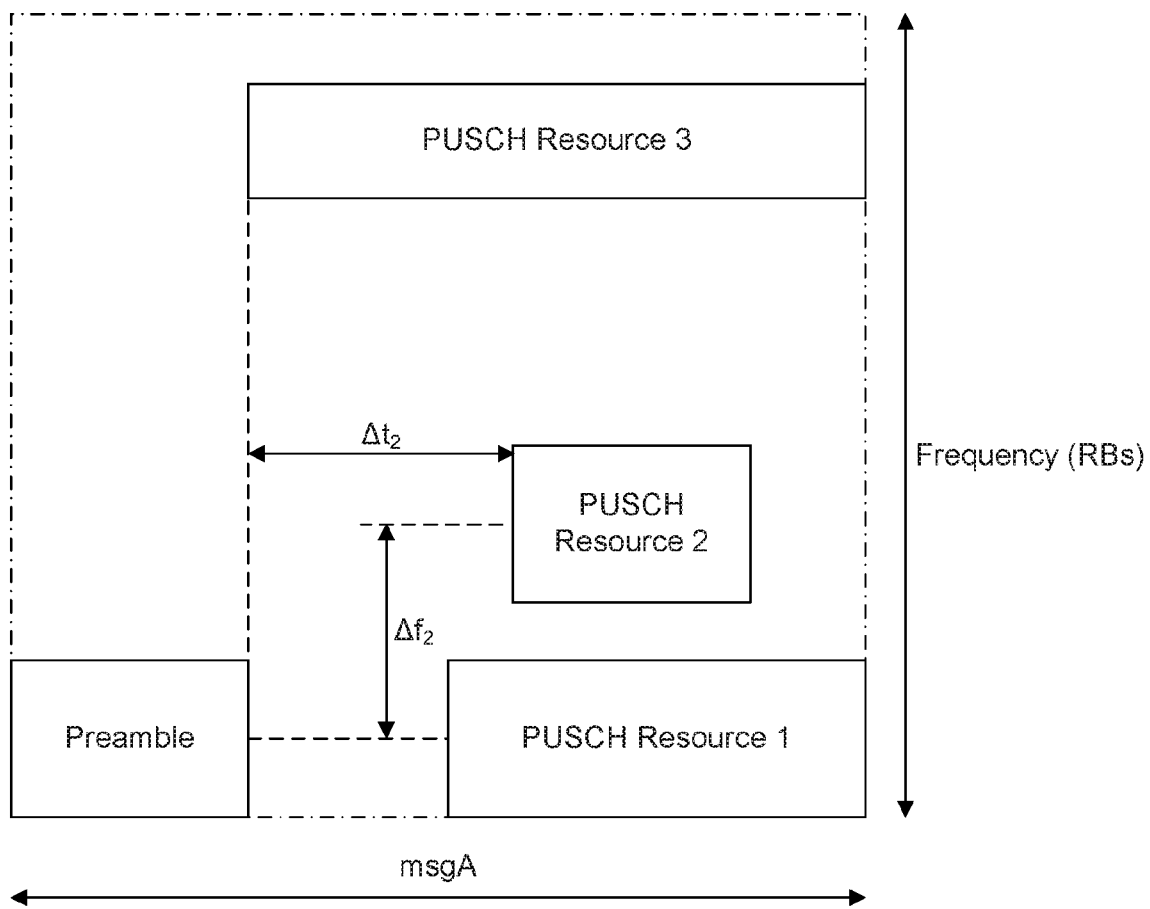
FIG. 5 is an example of a msgA transmission using a plurality of PUSCH resources.

FIG. 5 shows an example of msgA transmission using a plurality of PUSCH resources. As shown in FIG. 5, the mapping of each additional PUSCH resource may have a different time and/or frequency offset with respect to a preamble location that may be configured. In FIG. 5, $\Delta t2$ represents a configurable time offset value of PUSCH Resource 2 and $\Delta f2$ represents a configurable frequency offset value of PUSCH Resource 2 with respect to the preamble location. In an example, $\Delta t2$ may be determined based on another system operational parameter (e.g., delay tolerance of the service, mobility state).

In an example, a WTRU may determine a mapping of additional PUSCH resources based on allocation information of the original PUSCH transmission and a time offset value ($\Delta t_i$) and a frequency offset value ($\Delta f_i$) value of additional PUSCH resources.

A multiplicity, size and pattern of additional PUSCH resources may be determined based on system configuration parameters (e.g., service type, delay, reliability requirements) or operational parameters (e.g. SINR, traffic load, interference). A WTRU may be configured with a plurality of additional PUSCH resources according to an expected transmission reliability and delay tolerance. In an example, a WTRU, such as a URLLC WTRU, may be configured with a plurality of PUSCH resources to enhance the likelihood of a successful msgA transmission.

The mapping of additional PUSCH resources may have a fixed or a variable pattern per slot that may be pre-configured. In an example, the mapping of additional PUSCH resources may be determined based on other system parameters (e.g., UE ID, slot number).

The pattern of additional PUSCH resources may be randomly selected by a WTRU. The pattern of additional PUSCH resources may be linked to the choice of the preamble.

In an embodiment, each transmission instance of an additional PUSCH resource may use a same panel as the original transmission, but may have a different precoding or beam than the original transmission. Alternatively, each transmission instance on an additional PUSCH resource may use a different panel.

In an embodiment, additional PUSCH resources may be used to repeat an original transmission with a same MCS. The repetition on each additional PUSCH resource may be with a same redundancy version (RV) as the original transmission. In an example, at least one repetition may have a different RV than the original transmission.

In an embodiment, additional PUSCH resources may be used to repeat an original transmission with a different MCS. A WTRU may use different PUSCH resources according to the MCS selected for the additional PUSCH transmission.

In an embodiment, a set of preambles may be associated with a same set of PUSCH resources. A preamble selected from the set of preambles may refer to the same set of overlapped PUSCH resources. A WTRU that selects a preamble from this set may trigger a WTRU-ID selection for the PUSCH transmission. In a WTRU-ID selection process, a WTRU may combine its RA-RNTI with an additional parameter such as a preamble index. The WTRU-IDs may be used for WTRU specific scrambling.

In an embodiment, a WTRU may use a set of resources to transmit a resource assignment and use another set of resources to transmit other information. The content transmitted on the first set of resources may include PRBs, MCS, and DMRS indices. For example, a WTRU may use shared resources to transmit a resource assignment used by the WTRU for the non-shared resources. The content transmitted on the shared resources may include PRBs, MCS, and DMRS indices. One or several shared resources may be available for the WTRU to choose from. A WTRU may randomly select one or multiple sets from the non-shared resources to transmit its payload. A WTRU may randomly select one of the non-shared resources to transmit parameters that may be necessary to decode the payload sent on the shared resources. The parameters may include UE-ID, DMRS indices, or other identifiers.

Figure 6:
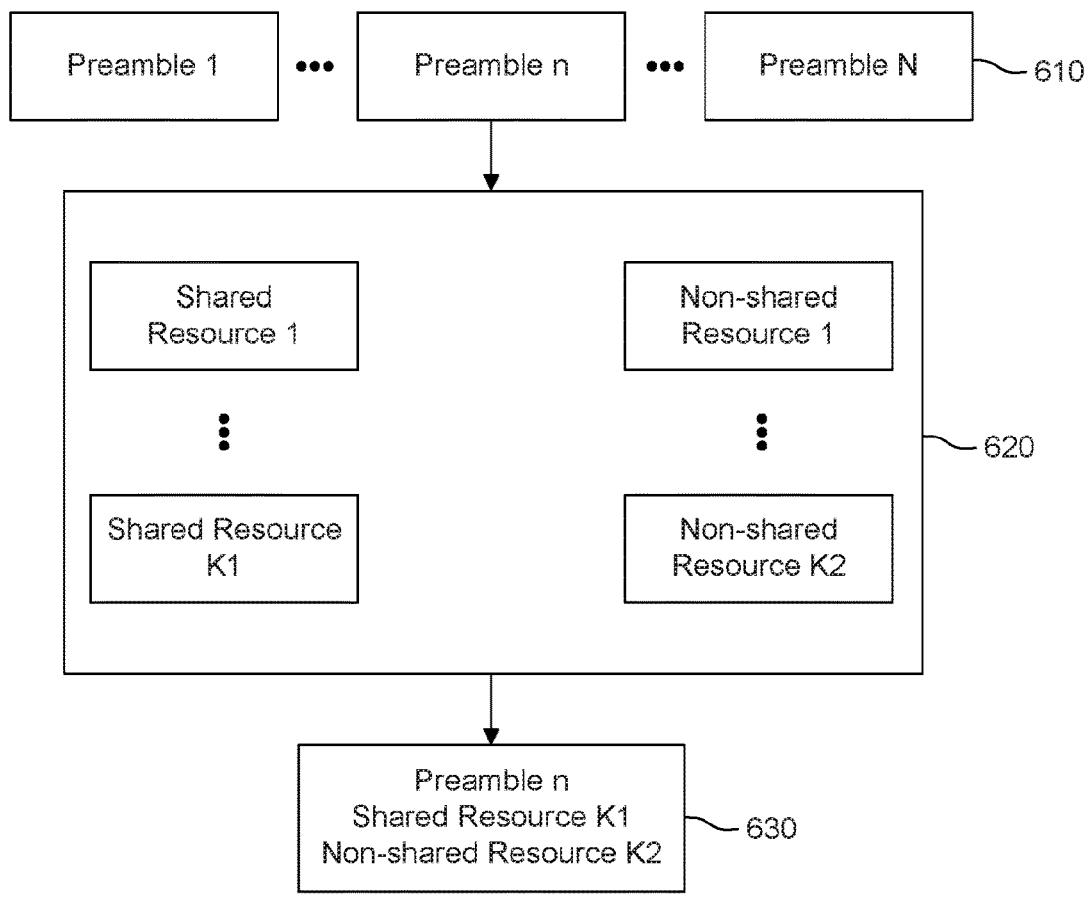
FIG. 6 is an example of a WTRU selection of shared and non-shared resources.

FIG. 6 shows an example of a WTRU using a set of shared resources and a set of non-shared resources. A preamble may be associated with one or more sets of shared resources and one or more sets of non-shared resources. A set of shared resources may be used jointly with non-shared resources to complement each other. A WTRU may select a preamble (610). The WTRU may select a set of shared resources and a set of non-shared resources (620). The WTRU may transmit on the shared resources and the non-shared resources (630).

In an embodiment, a WTRU may dynamically switch between shared resources and non-shared resources by selecting different preambles. Preambles may be associated with either shared or non-shared resources. For example, preamble set 1 may be associated with non-shared resources while preamble set 2 may be associated to one or multiple sets of shared resources. A WTRU may randomly select one out of K preambles and transmit its payload on the associated PUSCH resources. If a WTRU selects a preamble associated to a set of shared resources, the WTRU may trigger a WTRU-ID selection for UL-SCH scrambling. A WTRU may be triggered by higher layers to select from either preamble set.

A WTRU may be configured with uplink grant resources that may be used for transmission of a PUSCH in a 2-Step RACH procedure. The configured grant resources, or configuration, may be provided in a broadcast message (e.g. in a PBCH) or may be provided in a WTRU-specific manner (e.g. for CONNECTED mode WTRUs). The configured grant resources may have a specific time periodicity and offset and a specific frequency location.

A WTRU may transmit a preamble in a random access occasion. The WTRU may map a PUSCH transmission to an upcoming configured grant resource. The configured grant resource may include uplink control information that may indicate the PRACH transmission it is associated with. For example, uplink control information in the configured grant may include at least one of: a preamble sequence, PRACH resources, a timing offset (between the configured grant and the previously transmitted PRACH), or any parameter used by the WTRU to determine a PRACH parameter (e.g. WTRU ID).

A WTRU may determine a linkage or relationship between a preamble transmission and a configured grant resource based on a timing between the preamble transmission and the configured grant resource. For example, a WTRU transmitting a preamble at time x, may transmit on a first configured grant resource available after time x+t, where t may be configurable and may be provided by a gNB or may be determined by the WTRU as a function of WTRU capability.

A WTRU may determine a linkage between a preamble transmission and a configured grant resource based on a linkage to the preamble resource. For example, a WTRU may determine a configured grant resource based on the resource used to transmit the PRACH.

A WTRU may determine a linkage between a preamble transmission and a configured grant resource based on linkage to the preamble sequence. For example, a WTRU may determine a configured grant resource as a function of the selected PRACH preamble.

A WTRU may determine a linkage between a preamble transmission and a configured grant resource based on a synchronization signal block (SSB) measurement. For example, a WTRU may determine a configured grant resource based on at least one SSB measurement. This may enable the WTRU to use the appropriate configured grant that uses a same beam as that of the SSB.

A WTRU may determine a linkage between a preamble transmission and a configured grant resource based on a parameter of a PUSCH transmission. For example, different configured grants may enable different transport block sizes. The WTRU may select a configured grant resource that best matches its required transport block size. In another example, a WTRU may select a specific configured grant based on a low code rate spreading (LCRS) sequence or a DM-RS.

A WTRU may determine a linkage between a preamble transmission and a configured grant resource based on a parameter of a PRACH transmission. For example, depending on the number of PRACH retransmissions, the WTRU may select a specific configured grant resource.

A WTRU may determine a linkage between a preamble transmission and a configured grant resource based on BWP.

For example, depending on a BWP used for the transmission of a preamble, the WTRU may select a specific configured grant.

A WTRU may determine a linkage between a preamble transmission and a configured grant resource based on a need for a future transmission. In an embodiment, a 2-Step RACH procedure may enable a WTRU to transmit all the data it has in its buffer, whereas in another embodiment, the WTRU may require future resources to empty its buffer. A WTRU may select a configured grant resource depending on whether the 2-Step RACH procedure is sufficient or whether future scheduling is required.

Figure 7:
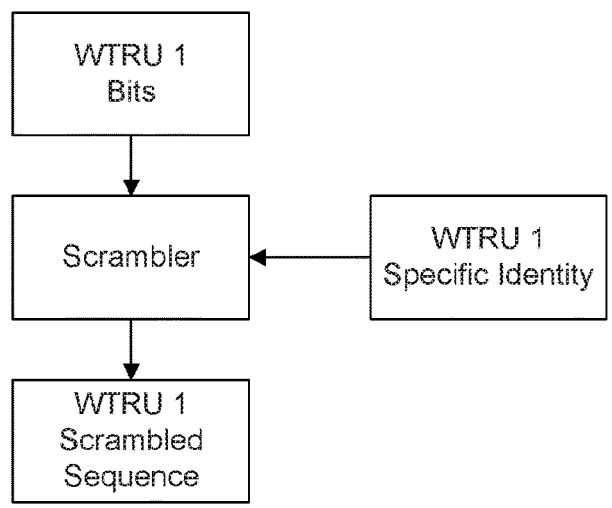
FIG. 7 is an example of a WTRU scrambled sequence based on a WTRU-specific identity.

A WTRU, such as a Rel-15 low code rate spreading (LCRS) WTRU, may scramble its bits with a WTRU-specific identity. FIG. 7 shows an example of using a bit sequence scrambled with a scrambling sequence which may be calculated based on the WTRU-specific identity. In Rel-15, a scrambling sequence generator may be initialized according to 3GPP TS 38.211, section 6.3.1.1: $c_{init}=n_{RNTI} \cdot 2^{15}+n_{ID}$ where $n_{RNTI}$ is the RNTI associated with the PUSCH transmission and $n_{ID}=N_{ID}^{cell}$ in a PRACH transmission.

A Rel-15 RA-RNTI may be calculated as: RA-RNTI=1+s_id+14×t_id+14×80×f_id+14×80×8×ul_carrier_id where s_id, t_id, f_id, and ul_carrier_id are preconfigured parameters, where s_id is the index of the first OFDM symbol of the PRACH occasion (0≤s_id<14), t_id is the index of the first slot of the PRACH occasion in a system frame (0≤t_id<80), fid is the index of the PRACH occasion in the frequency domain (0≤f_id<8), and ul_carrier_id is the UL carrier used for Random Access Preamble transmission (0 for NUL carrier, and 1 for SUL carrier.

The RA-RNTI may be preconfigured during initial access as part of a SIB RACH configuration or it may be semi-statically RRC reconfigured. The RA-RNTI may be common to multiple preambles configured to the same PRACH transmission opportunity.

When initiating a PRACH, a WTRU may not have a WTRU-specific identity configured. A WTRU may only be configured with a RA-RNTI. Enhancements may be needed in 2-step RACH such that a preamble may be used to partially or fully determine the WTRU-specific identity used for the scrambling in the UL-SCH processing chain and for transmitting a PUSCH.

In an embodiment, for 2-step RACH operation, a WTRU may be configured with a unique RNTI, such as 2RA-RNTI. The 2RA-RNTI may be considered as a WTRU-ID and may be used for data and CRC scrambling. The 2RA-RNTI may be configured to a subset of WTRUs based on, for example, a service type, a measurement. In an embodiment, a WTRU may choose an RNTI based on the RA-RNTI as the $n_{RNTI}$ for the UL-SCH scrambling and the UE may link $n_{RNTI}$ to the preamble selection.

Each preamble may be associated with a different or a common RNTI which may be based on the RA-RNTI. The RNTI used for scrambling may be configured based in part or completely on the preamble in one of several ways.

The RNTI used for scrambling may be configured based on a PRACH transmission opportunity. Each preamble may be configured to different PRACH transmission opportunities yielding different RA-RNTIs. A WTRU may randomly choose a preamble and may calculate an RA-RNTI to which it is uniquely associated. For example, one preamble may be associated with PRACH transmission opportunity 1 and another preamble may be associated with PRACH transmission opportunity 2. The RA-RNTIs calculated for each PRACH transmission opportunity may be different and may be used as a multiple access signature.

Figure 8:
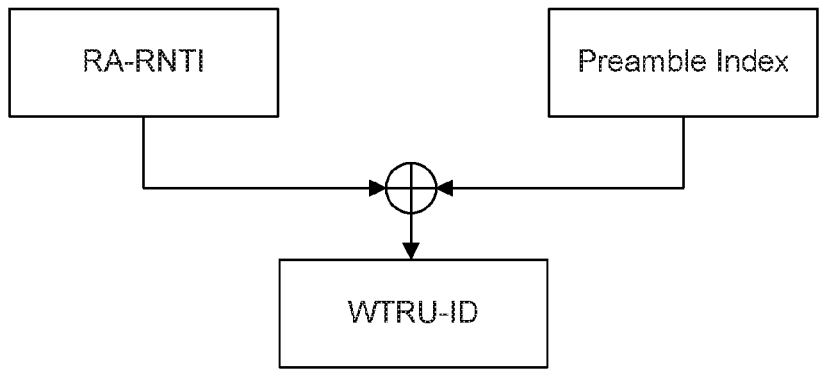
FIG. 8 is an example of a WTRU-ID based on a RA-RNTI and a preamble index.

The RNTI used for scrambling may be configured based on a preamble index. A modified RNTI may be used which may be made up of two parts. One part may be a common RA-RNTI used for a group of N preambles multiplexed in a same PRACH transmission opportunity. The second part may be the preamble identity within the group. A WTRU may choose (e.g. randomly) one out of N preambles within a group. The WTRU may calculate a common RA-RNTI for the PRACH opportunity configured for the group. For example, as shown in FIG. 8, a WTRU may initialize its scrambler as a function of RA-RNTI and a selected preamble index (Pi) (e.g., RA-RNTI+Pi). A gNB may detect the preamble (Pi) within a PRACH transmission opportunity and may unscramble the WTRU's data by determining the scrambler's initial seed based on a function (e.g., RA-RNTI+Pi).

In an embodiment, scrambling may be determined using a WTRU-specific interleaver. WTRU-specific interleavers may be obtained based on a detected preamble index. For example, cyclically shifting the interleaved bit sequence based on the preamble index may have the same effect as applying a WTRU-specific scrambler. The gNB may deinterleave the WTRU's data based on the detected preamble index.

Preamble collisions may occur when more than one WTRU randomly selects the same preamble which may lead to multiple WTRUs selecting the same WTRU-ID. To enable a gNB to successfully detect data, additional enhancements to the link between a preamble and WTRU-ID may be considered to reduce the probability of failed detections due to preamble collision. Assuming WTRUs transmit on overlapping PUSCH resources, the association between preambles and WTRU-IDs may be enhanced in the following ways.

Figure 9:
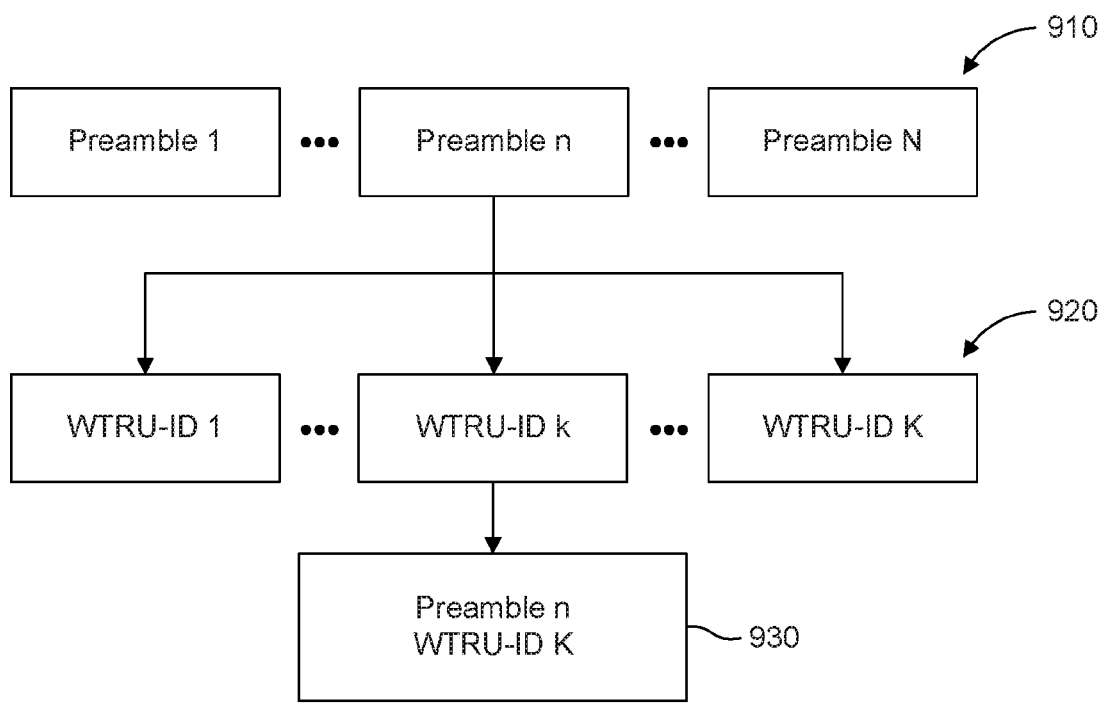
FIG. 9 is an example of preamble and WTRU-ID selection.

In an embodiment, as shown in FIG. 9, multiple WTRU-IDs may be associated to one preamble. A WTRU may randomly select a preamble (910). The preamble may be linked to a subset or to an entire set of available WTRU-IDs. The preamble selection may trigger a WTRU-ID selection. The WTRU may select (e.g. randomly) one or several WTRUs-IDs from the subset (920). The WTRU may transmit the selected preamble and scramble using the selected WTRU-ID (930). The gNB may detect the preamble and may infer that the WTRU-ID used is one from the linked subset. All WTRU-IDs used with the associated preamble may be used to transmit on the shared PUSCH resources.

In an embodiment, multiple preambles may be linked to a subset of WTRU-IDs. Multiple WTRUs may select a same or different preambles and the preambles may be associated to a common subset of WTRU-IDs. After selecting one of the preambles, a WTRU may select one of the WTRU-IDs from the common subset. All WTRU-IDs configured in the subset may be used to transmit on an overlapping set of shared PUSCH resources.

Multilayer LCRS transmissions may be enabled in the UL-SCH processing chain by splitting the raw bitstream into L layers and performing scrambling on each layer. One specific scrambling sequence may be used per layer. In Rel. 15, a WTRU may only use one WTRU-ID to scramble a PUSCH. However, for multilayer transmission, a WTRU may use multiple WTRU-IDs where each WTRU-ID may correspond to one layer. With a msgA preamble and payload transmission, a WTRU may select a preamble and may need to generate multiple WTRU-IDs. Enhancements may be needed to allow a WTRU to link multiple WTRU-IDs to one PUSCH transmission.

In an embodiment, a WTRU may select multiple WTRU-IDs based on a preamble and simultaneously use multiple WTRU-IDs in multilayer transmission (e.g. LCRS). For example, a set of preambles may be partitioned into groups depending on a number of layers and WTRU-IDs may be assigned to each group. As shown in FIG. 10, for L layer transmission, one preamble may be associated with L WTRU-IDs. A WTRU may choose one preamble and may use the L associated WTRU-IDs to perform multilayer transmission. In an embodiment, the group for L layers may comprise more than L WTRU-IDs and the WTRU may choose L out of a total number of available WTRU-IDs. A gNB may detect the preamble and may implicitly determine that L layers are transmitted based on the group containing the preamble index.

In an embodiment, a WTRU may choose one WTRU-ID and determine the L−1 other WTRU-IDs as a function of the first WTRU-ID. A predetermined function may be configured during RACH parameter configuration such that the WTRU may derive the L−1 WTRU-IDs relative to the first one determined by the preamble. For example, a WTRU may choose one WTRU-ID based on the preamble and may compute L−1 other WTRU-IDs such as WTRU-ID+1, WTRU-ID+2, . . . WTRU-ID+L−1. Other functions may be used to determine the L WTRU-IDs in a sequential or distributed manner.

In an embodiment, the number of layers and the WTRU-ID determination may be linked to DMRS selection. One DMRS may be mapped to multiple WTRU-IDs during RACH configuration. The number of WTRU-IDs associated with each DMRS may depend on the number of layers such that one DMRS may map to L WTRU-IDs. For example, a WTRU may randomly select a preamble to which a set of DMRS is linked. For an L layer transmission, the WTRU may select the DMRS linked to L WTRU-IDs. A gNB may detect the preamble and the DMRS index. Based on the DMRS index, the gNB may implicitly determine that the WTRU used L layers with corresponding WTRU-IDs. For example, the WTRU-IDs for the L layers may be based on the RA-RNTI+preamble index+DMRS index+L.

In an embodiment, DMRS configuration may be linked to a selected preamble. A DMRS configuration may be characterized with its time and frequency density, pattern, sequence and its scrambling mechanism.

In an embodiment, a preamble set may be partitioned in several groups based on channel dispersity in time and frequency, where each partition may be linked to a specific DMRS pattern with proper density and pattern. In an embodiment, a WTRU may select a preamble based on its estimate of the uplink channel. The WTRU may adopt a DMRS definition according to its selected preamble.

As part of a 2-Step RACH procedure, a WTRU may select preamble and PUSCH resources. In addition, a WTRU may also require a DMRS port to assist a gNB in decoding the payload portion of msgA. A WTRU may select a DMRS port which may be generated for example according to Rel. 15. In Rel. 15, a DMRS for a PUSCH is initialized using a random sequence which is generated with an initial seed $c_{init}$ according to 38.211 6.4.1.1: $c_{init}=(2^{17}(N_{symb}^{slot}n_{s,f}^{\mu}+l+1)(2N_{ID}^{nSCID}+1)+2N_{ID}^{nSCID}+n_{SCID}) \mod 2^{31}$ where $N_{symb}^{slot}$ is the number of symbols per slot, $n_{s,f}^{\mu}$ is the slot number s within a frame f for subcarrier spacing μ, and l is the OFDM symbol number within the slot. $N_{ID}^{nSCID}$ and $n_{SCID}$ represent the scrambling identity and may be configured to generate the DMRS sequence corresponding to a PUSCH transmission. Without an RRC configuration and without a configured grant or without a DCI to schedule the PUSCH, $n_{SCID}=0$, $N_{ID}^{nSCID}=N_{ID}^{cell}$. This may be the case when a WTRU is in IDLE mode and initiates a 2-Step RACH procedure. The IDLE WTRUs within the cell may use the same scrambling identity to generate their DMRS sequences. A DMRS collision may occur if multiple WTRUs select a same DMRS port generated from a same sequence and map to the same physical resources. Enhancements may be needed to allow the IDLE WTRUs to generate their own DMRS sequences.

In an embodiment, a WTRU may determine $N_{ID}^{nSCID}$ according to a mapping based on a preamble index. The mapping may be configured during initial access with RACH parameter configuration. A preamble may determine a scrambling identity by mapping to a set of valid values. For example, a gNB may preconfigure a one-to-one mapping between $N_{ID}^{nSCID}$ and preambles. Each preamble choice may determine a DMRS sequence.

In an embodiment, multiple preambles may map to a scrambling identity. A unique scrambling identity may be derived as a function of a preamble, DMRS index and the common scrambling identity. For example, the scrambling identity may comprise of one part with a common value such as the RA-RNTI or a predefined set of values and another part such as preamble index or DMRS index.

In an embodiment, a preamble may be mapped to a set containing multiple $N_{ID}^{nSCID}$. If multiple WTRUs select a same preamble, they may randomly pick one value from the set of corresponding $N_{ID}^{nSCID}$. Multiple WTRUs may be able to generate different DMRS sequences even if they choose the same preamble.

Multiple WTRUs may randomly select a same preamble when multiple preambles are mapped to one DMRS sequence. The preamble may not be sufficient to generate a WTRU-specific DMRS sequence since the DMRS sequence may be generated similarly for multiple WTRUs with a scrambling identity initialized using $N_{ID}^{nSCID}$. $N_{ID}^{nSCID}$ may be a preconfigured common value which may be shared by multiple WTRUs. A collision may occur if the same DMRS sequence is used with the same port by multiple WTRUs.

In an embodiment, a WTRU may generate a DMRS sequence based on a preamble and may select (e.g. randomly) a DMRS port. A DMRS port selection may be randomized and taken from a set of available ports that may be preconfigured with the RACH configuration during initial access. A WTRU may randomly choose a DMRS port to transmit and reduce the chance of a collision even if the same DMRS scrambling identity is used. Additionally, if multiple WTRUs share a same PUSCH resources, the DMRS scrambling identity may be used along with the port number to generate the scrambler for the UL-DSCH. For example, a WTRU may select a preamble and generate a DMRS sequence based on the preamble. The WTRU may choose an antenna port. The scrambler used for the UL-SCH may be for example $N_{ID}^{nSCID}$+preamble index+antenna port index. Multiple WTRUs may transmit with a same DMRS sequence on different ports with a PUSCH scrambled WTRU-ID based on the DMRS sequence associated to multiple preambles and the port numbers chosen by each WTRU. The receiver may decode the PUSCH based on the preamble index which may map to a DMRS sequence and to the port number which initializes the PUSCH scrambling.

Figure 11:
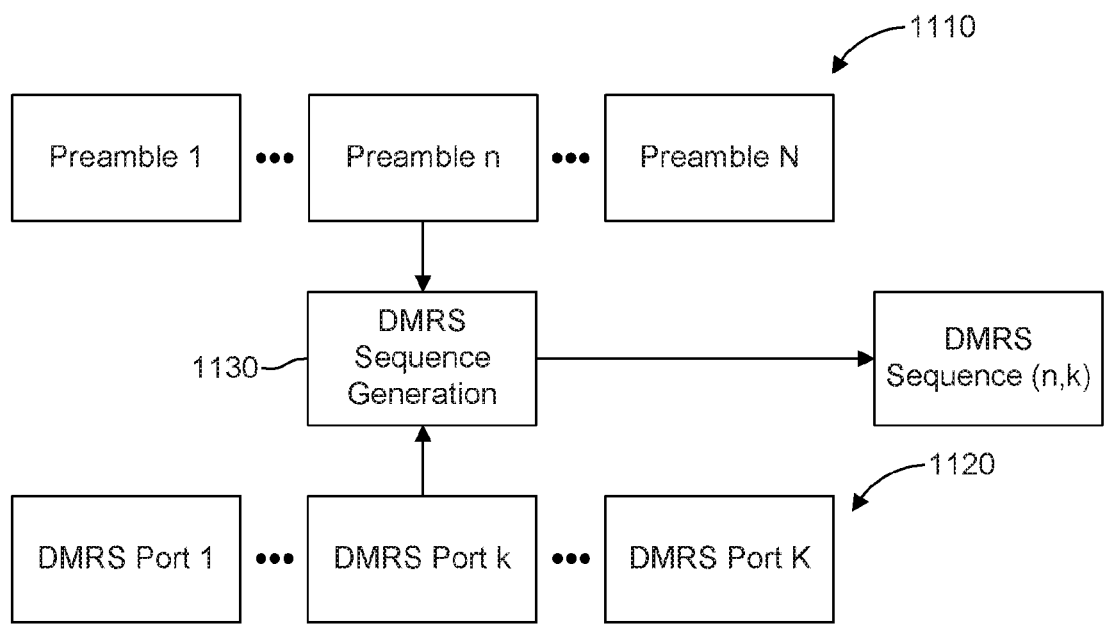
FIG. 11 is an example DMRS sequence generation.

The DMRS scrambling identity may be generated based on a preamble and port selection. In the event that multiple WTRUs select the same ports, different preambles may generate different scrambling identities for the DMRS, as shown FIG. 11. A WTRU may choose a preamble (preamble n) from a pool of available preambles (1110). The WTRU may choose a DMRS port (DMRS port k) from a pool of available DMRS ports (1120). The WTRU may generate a DMRS sequence which may take as inputs preamble n and DMRS port k from which a sequence initialization value is calculated (1130). The DMRS sequence may be generated as a function of (n,k). The pair (n,k) may be preconfigured to map to a set of $N_{ID}^{nSCID}$ values from which the WTRU may randomly choose one $N_{ID}^{nSCID}$ from the set. The $N_{ID}^{nSCID}$ may be uniquely determined as a function of (n,k). For example, the identity may be computed based on a predetermined function of n and k.

In 2-Step RACH, msgA may be expected to carry a random access preamble (msg1) and a RRC connection request (msg3). However, the RRC connection request may need to be transmitted on a PUSCH. Compared to 4-Step RACH where the information regarding the PUSCH is transmitted on a RAR uplink grant as part of msg2, in 2-Step RACH, a gNB may not be able to dynamically provide such information.

In an embodiment, the WTRU may use an uplink configured grant for transmission of the data part of msgA (e.g., RRC connection request). The WTRU may semi-statically be configured with one or more RAR uplink grants by higher layers on a licensed or unlicensed band. The WTRU may select one of the configured uplink grants for transmission of msgA on a PUSCH based on one or more combination of the following parameters.

A parameter may be a listen before talk (LBT) category for PUSCH transmission in an unlicensed band. In an example, if the LBT category for transmission of msgA is 0 or 1, then it may mean that the WTRU may almost immediately transmit the PUSCH so the WTRU may need to select a configured PUSCH resource allocation which has a longer duration without any restriction on a starting symbol. In an example, if a LBT category 4 is needed for transmission of msgA, then the WTRU may use a configured PUSCH resource allocation where the start symbol is later in the slot and the length of PUSCH is shorter.

A parameter may be Channel Occupancy Time (COT) attributes in an unlicensed band (e.g., COT length, COT starting OFDM symbol, COT last OFDM symbol). In an example, if msgA is expected to be transmitted toward the end of the COT, then the WTRU may need to select a configured PUSCH resource allocation with the appropriate length which is aligned with the COT last OFDM symbol.

Other parameters may include: configured PUSCH start symbol and length; configured PUSCH mapping type; configured PUSCH frequency domain resource allocation; configured Modulation and Coding scheme; configured number of DM-RS CDM groups and DM-RS ports for the configured PUSCH; configured number of repetitions to be applied to the transmitted transport block on the configured PUSCH (for example, in the unlicensed bands, the COT duration could be 5 msec or 10 msec and each slot may be 1 msec for 15 kHz subcarrier spacing, then the WTRU may need to select a configured uplink grant where the number of repetitions are less than or equal a maximum length of COT (e.g., between 5 to 10)); uplink measurements (e.g., L1-RSRP, RLM, RSRP, RSRQ); and channel sensing at the WTRU side.

In an embodiment, a WTRU may be semi-statically configured by a higher layer parameter, for example a configured RAR grant configuration (configuredRARGrantConfig) parameter. The following are examples of higher layer parameters that may be applied by the WTRU for a PUSCH transmission corresponding to msgA: frequency hopping flag; PUSCH frequency resource allocation; PUSCH time resource allocation; Modulation and Coding scheme; and TPC command for PUSCH.

A WTRU may be configured to transmit a PUSCH carrying msgA with repetitions. In this case, the WTRU may also be provided with a redundancy version pattern to be applied to the PUSCH repetitions carrying msgA. A configured RV sequence for msgA repetitions may be {0,2,3,1}, {0,3,0,3}, or {0,0,0,0}. If the WTRU is configured to transmit the PUSCH carrying msgA without repetitions, then the WTRU may use the redundancy version 0 for the PUSCH transmission carrying msgA.

In an embodiment, in case msgA is transmitted with HARQ enabled, the WTRU may include one or a combination of the following information in a PUSCH carrying msgA to assist a gNB with the msgA detection: new data indicator (NDI); HARQ ID; redundancy version (RV); WTRU ID; COT sharing information (e.g., for the unlicensed band).

A WTRU may determine a parameter of a PUSCH transmission based on a measurement performed. The measurement may be performed prior to a transmission of the preamble and/or a PUSCH of msgA. The parameter of the PUSCH transmission may include at least one of: MCS, uplink power control (e.g. an initial offset value); precoding; analog beam; time location; frequency resource; LBT used (i.e. for an unlicensed channel access).

The measurement may include at least one of: SSB and/or DM-RS and/or CSI-RS measurements; LBT performance (for example, based on the number of failed LBTs prior to a successful LBT the WTRU may determine different PUSCH transmission parameters); channel occupancy (CO) or RSSI (this may enable better performance in unlicensed channels); RRM measurements (RSRP, RSRQ, SINR); RLM results (for example, for random access triggered by RLM, the parameters of the RLM may affect parameters of a future MsgA PUSCH); path loss.

In an embodiment, a WTRU may measure multiple CSI-RS prior to transmitting at least a PUSCH portion of msgA. The WTRU may determine a beam to transmit on based on at least one CSI-RS measurement. The WTRU may determine resources on which to transmit a PUSCH based on the selection of the beam. The WTRU may construct the transport block based on the outcome of such measurement process in order to enable refinement of at least the MCS to best match the channel conditions on the selected beam.

In an embodiment, a WTRU may determine a parameter of a PUSCH transmission based on a previous use of such a parameter for a previous transmission of a PUSCH on a same channel. In an embodiment, the parameter of the PUSCH may depend on a parameter of the preamble. For example, a power of the PUSCH transmission may be determined as a function of a power used for the preamble.

For a retransmission a WTRU may adapt at least one parameter of the preamble and/or PUSCH. The WTRU may behave differently depending on whether the WTRU is required to retransmit the preamble, the PUSCH, or both the preamble and the PUSCH.

In an embodiment where both a preamble and a PUSCH are to be retransmitted, the WTRU may use power ramping for the preamble and may maintain an association between the power of the preamble and the PUSCH (e.g. it may increase the power of the PUSCH as well). The WTRU may keep or modify other parameters of the PUSCH as well. For example, the WTRU may modify the MCS level which may improve PUSCH robustness.

In an embodiment, a WTRU may increment a power level of a preamble and not change a power of a PUSCH transmission. In an embodiment, the WTRU may maintain two separate uplink power control processes: one for the preamble and another one for the PUSCH. The WTRU may receive msgB indicating how to increment the separate uplink power control processes.

For a retransmission, a resource of the PUSCH may be modified such that an association with the resources of the preamble may not be maintained per retransmission.

In an embodiment where only a PUSCH is to be transmitted, a WTRU may be indicated to increase uplink power by closed loop power control. In an embodiment, the WTRU may independently increment a power of the PUSCH transmission (e.g. determined as a function of a number of retransmissions of msgA PUSCH). In an embodiment, the WTRU may reduce the MCS for each retransmission. In an embodiment, the WTRU may first increase a power, while keeping an MCS constant and upon reaching a maximum power may begin reducing MCS levels for subsequent retransmissions. In an embodiment, the WTRU may first reduce an MCS level, and upon reaching a minimum value, which may be configurable, the WTRU may begin incrementing uplink power for subsequent retransmissions.

In an embodiment where only a preamble is to be retransmitted, a WTRU may use power ramping for the preamble. The WTRU may perform virtual link adaptation on a PUSCH such that at a future time when a PUSCH is to be transmitted, the WTRU may determine a new value of uplink power and/or MCS as a function of a number of times the preamble was retransmitted (with or without PUSCH).

A preamble may be linked to multiple PUSCH resources. A WTRU may choose to transmit on a subset of available PUSCH resources and the WTRU may choose different transmission parameters. A subset of PUSCH resources may comprise one, multiple, or all RBs from the PUSCH resources. The resources may be located in different time/frequency regions as configured in the PUSCH transmission occasion. Since msgA may be transmitted without a resource assignment from the gNB, the WTRU may choose PUSCH resources from the configured PUSCH occasion. However, the gNB may not be aware of the WTRU's choice of PUSCH transmission parameters. The WTRU may need to signal to the gNB a location of resources for decoding to take place.

In an embodiment, a DMRS sequence or port may be linked to a configuration of PUSCH resources. The link may be preconfigured during initial access such that a DMRS sequence index or port may uniquely determine a set of PUSCH parameters. A gNB may implicitly determine a time and frequency location of PUSCH resources based on the DMRS sequence used. A DMRS sequence may be associated with a set of time and frequency offsets with respect to a preamble from which the PUSCH resource locations and quantity are determined.

In an embodiment, a WTRU may change a DMRS sequence or port to signal a change in transmission parameters. For example, in a situation where msgA fails, a WTRU may retransmit msgA with a different coding rate or with different PUSCH resources. The location of the PUSCH resources may be different than the initial transmission to accommodate a different coding rate or the additional PUSCH resources. After receiving the gNB's response to a msgA transmission failure, the WTRU may keep or change its DMRS sequence or port.

If a WTRU reuses, for the retransmission, a same DMRS sequence or port as an initial or previous transmission, the WTRU may implicitly signal to the gNB that the same transmission parameters for the PUSCH are reused. The gNB may determine that the retransmission occurs on a same part of the bandwidth as the initial transmission. If a different DMRS sequence or port is used for the retransmission, the location and number of resources used for the retransmission may be derived based on the choice of DMRS sequence or port and its associated PUSCH parameter list.

A WTRU may perform measurements on one or more received downlink synchronization signal blocks (SSBs). The WTRU may use the measurements in determining a beam or spatial filter to use for transmitting a msgA preamble. For a msgA PUSCH transmission, the WTRU may use a same beam or a same spatial filter used for the msgA preamble transmission. A gNB may use energy detection in receiving a msgA preamble and may use demodulation or decoding in receiving a msgA PUSCH payload. A beam that may be sufficient for a msgA preamble transmission may not be sufficient for a msgA PUSCH transmission. The msgA PUSCH transmission may require a higher signal to noise ratio (SNR) than for the msgA preamble transmission. A failure in a msgA PUSCH detection by a gNB may result in a WTRU retransmitting both the preamble part and the PUSCH part of a msgA, which may increase latency and delay. A WTRU may use a beam refinement procedure to refine a beam to use for a msgA PUSCH transmission, which may increase signal reception.

Figure 12:
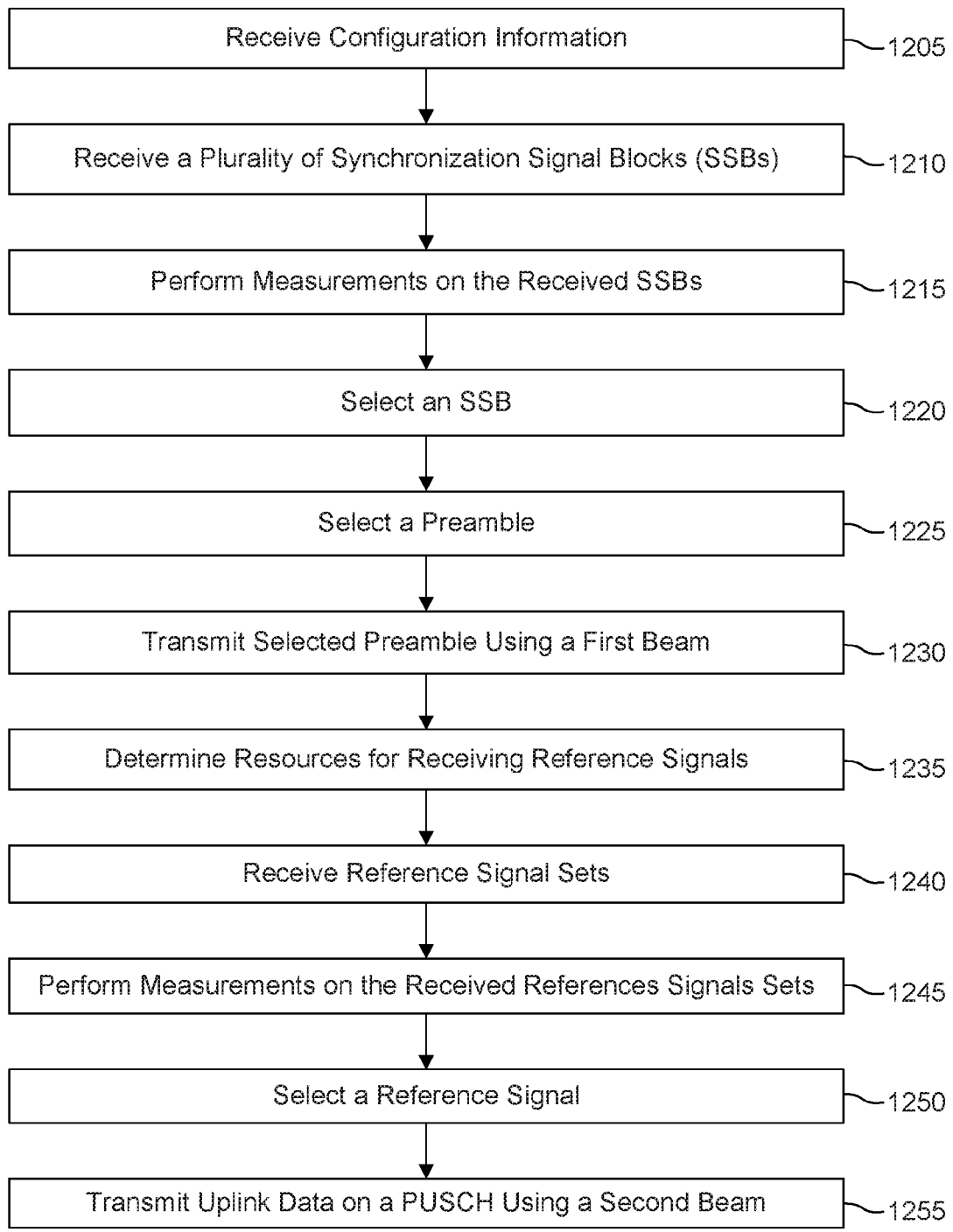
FIG. 12 is an example beam refinement for PUSCH transmission for msgA.

FIG. 12 shows an example beam refinement procedure. The beam refinement procedure may be in a context of a 2-step RACH procedure where a WTRU may transmit a first message (e.g. msgA) that may comprise a preamble and a PUSCH payload.

A WTRU may receive configuration information (1205). The configuration information may be received from a gNB. The configuration information may comprise an association between preambles and SSBs. The configuration information may comprise an association between preambles, references signal (RS) sets, and PUSCH resources. A reference signal may be, for example, a phase tracking reference signal (PTRS), a channel state information-reference signal (CSI-RS), or a demodulation reference signal (DMRS).

The WTRU may receive a plurality of SSBs (1210). Each SSB may be transmitted on its own beam. Each SSB may be transmitted over a period of time from a same cell. The WTRU may perform measurements on the received SSBs (1215). For example, the WTRU may measure a reference signal received power (RSRP). The WTRU may select an SSB (1220). The SSB selected may be based on the measurement. For example, the WTRU may select an SSB with an RSRP greater than a threshold value. The WTRU may receive the threshold value as part of an initial access, for example in a system information block (SIB). As another example, the WTRU may select an SSB with the highest RSRP. The WTRU may select a preamble (1225). The preamble may be selected based on the configuration information received from the gNB such that the preamble selected is associated with the selected SSB. The WTRU may transmit the selected preamble to the gNB using a first beam (1230). The first beam may be a coarse or wide beam. The first beam may be the same beam that the selected SSB was received on. The gNB may receive and detect the preamble and select a RS to send to the WTRU that are associated with the preamble. The transmission of the preamble to the gNB may trigger the gNB to determine a set of RSs and to transmit the RSs to the WTRU to be used for beam refinement.

The WTRU may determine resources for receiving reference signals in response to transmitting the preamble (1235). The WTRU may assume reception of K set of reference signals with K different narrow beams.

The WTRU may determine the resources for receiving the reference signals based on a parameter of an associated SSB. For example, depending on the SSB selected for the first beam, the WTRU may expect the presence of RS signals using resources associated to the selected SSB. The WTRU may expect different parameters of the RS to be associated to the SSB resource (e.g. sequence, transmit power, etc.).

The WTRU may determine the resources for receiving reference signals based on a parameter associated with the preamble transmission. For example, the resource used for the preamble transmission or the preamble sequence may be associated to a set of resources or set of RS parameters.

The WTRU may determine the resources for receiving reference signals be based on a parameter indicated in a broadcast message. For example, a PBCH may provide the resources on which the WTRU may expect reception of a RS.

The WTRU may determine the resources for receiving reference signals based on a WTRU specific configuration. For example, for CONNECTED mode WTRUs, a WTRU may be configured with resources on which to expect RS transmission.

The WTRU may receive one or more sets of RSs from the gNB (1240). The set of RSs received may be associated with the transmitted preamble. The WTRU may receive K sets of RSs on K different narrow beams. Each of the K sets of RSs may be associated with PUSCH resources. The associated may be implicit, explicit, semi-statically, or dynamically configured. For example, the configuration information received by the WTRU may indicate the association between sets of RSs and PUSCH resources. The WTRU may perform measurements on the received set of RSs (1245). The WTRU may select a RS (1250). The selection may be based on the measurement performed. For example, the WTRU may select a RS with a highest RSRP or may select a RS with a RSRP greater than a threshold value. The WTRU may receive the threshold value as part of an initial access, for example in a system information block (SIB). The WTRU may assume that the set of RSs used for beam refinement are quasi co-located (QCL-ed) with an SSB. The WTRU may use a set of RSs that are not QCL-ed with the SSB. The WTRU may indicate its use of non-QCL-ed reference signals to a gNB to assist gNB reception. Based on the selection of the RS, the WTRU may select a second (narrow) beam to transmit a PUSCH payload. The WTRU may determine resources or other parameters associated with the PUSCH payload transmission. The WTRU may transmit uplink data on a PUSCH (1255). The PUSCH may be transmitted on PUSCH resources that are associated with the selected RS. The PUSCH may be transmitted using the second (narrow) beam (or spatial filter) that is associated with the selected RS. The second beam may be the same beam that was used to receive the selected RS.

A WTRU may not receive a RS for beam refinement prior to transmission of a PUSCH payload. In such a case, the WTRU may indicate such to the gNB. The indication may be done implicitly based on the resource used to transmit the PUSCH. Failure to receive a beam refinement RS may cause the WTRU to retransmit the preamble. In such a case, the transmission power may be ramped up.

In an embodiment, an always on reference signal (RS) may be used for beam refinement. For example, a gNB may configure a set of periodic RSs (e.g. CSI-RS, PTRS) where each RS may be associated with a different spatial filter supporting different beams. A WTRU may perform measurements (e.g. RSRP) at any time on an always on RS to refine its beam selection. An always on signal may generate inter-cell interference because it is constantly broadcasted. It may also require reserving dedicated time/frequency resources in slots which may result in a large amount of overhead. A configured RS set (RSS) may be configured with a time offset relative to a RACH occasion (RO). In an embodiment, an RSS may be configured with a small time offset to occur prior to a RO which may allow sufficient time for a WTRU to perform beam measurement and adjustment.

In an embodiment, RS sets (RSSs) may be associated to one or more subsets of ROs through a PRACH configuration. For example, configured RSSs may have a same or a lower periodicity compared to a RO. A configuration of the RSSs may be provided with a RACH configuration in a SIB during initial access. For example, a WTRU in IDLE mode may have an option to wait for a RO that is supported by a configured RSS. An IDLE mode WTRU may refresh its RS selection based on the configured RSSs without having to request the RS transmission.

A WTRU in CONNECTED mode may benefit from a configured RS for beam refinement. A WTRU may determine the configuration of RSs associated to ROs from the TCI states of the configured bandwidth part.

The RSSs configuration may be associated with respect to a RACH configuration with a different periodicity. For example, a duty period of the RSSs may be flexibly configured to enable RSSs to be transmitted with every X RACH occasion. The RS transmission may be configured with a time hopping pattern corresponding to Y % of RACH occasions within a time period.

The RSSs configuration may be associated with respect to the RACH configuration with a different frequency granularity. For example, within a one time instance, there may be multiple ROs located in different PRBs. The RSSs may be transmitted every X PRBs. The RS transmission may be configured with a frequency hopping pattern corresponding to Y % of PRBs within a time instant.

The RSSs configuration may be associated with respect to a RACH configuration with a combination of different time and frequency parameters. For example, the configuration may be jointly such that X PRBs are occupied within Y time instants.

Figure 13:
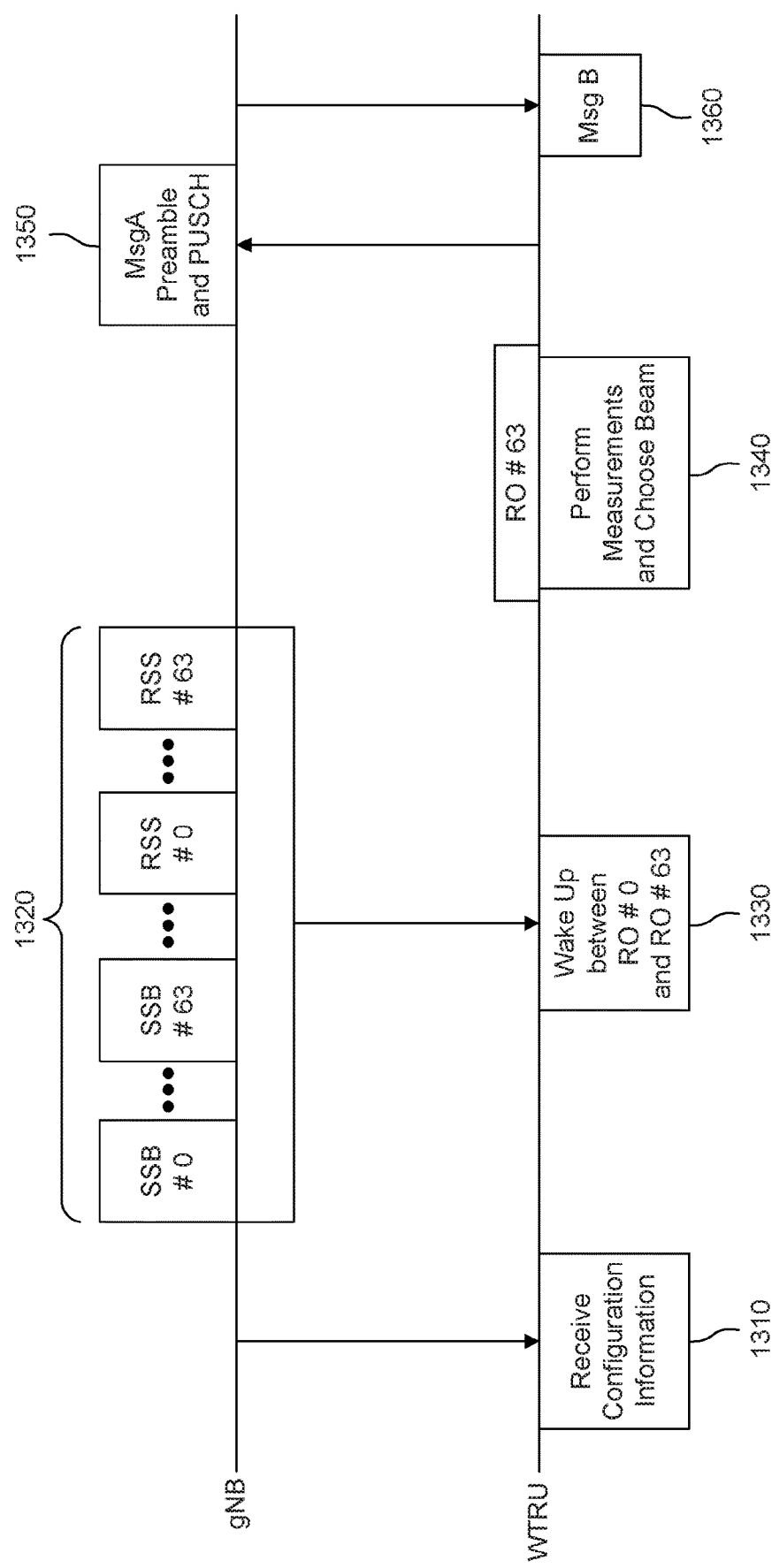
FIG. 13 is an example of beam refinement.

FIG. 13 shows an example of beam refinement. A WTRU may receive configuration information (1310). The configuration may be received from a gNB. The configuration information may be a PRACH configuration. The configuration information may indicate an association between SSBs and ROs. The configuration information may indicate an association between configured RSSs and ROs. A WTRU may receive SSBs and RSSs associated with RO #0 and RO #63 (1320). The WTRU may receive the SSBs and RSSs from the gNB. In the example of FIG. 13, 64 SSBs are configured with one RO linked per SSB. The ROs may be configured in a TDM manner. The RSSs in FIG. 13 are configured for RO #0 and RO #63 to provide some resources for WTRUs which require more beam choices. For the other ROs, only SSBs are transmitted. The RSSs allow the gNB to provide different beams with the RSS compared to SSB (e.g. narrower or more numerous).

The WTRU may wake up before a RO where only SSBs are available with no RSS (1330). Based on the RSS configuration, the WTRU may determine that it may wait until RO #63 to receive RSS which may provide alternative beam choices. The WTRU may decide to wait based on an expired timer since a last beam selection or based on an inadequate SSB beam quality measurement. The WTRU may perform measurements on the RSSs and may determine the best RS based on signal quality (e.g. RSRP) (1340). As part of the RACH configuration, the RSSs may be associated to preambles within the corresponding RACH occasion. The WTRU may send a preamble (e.g. msgA preamble) corresponding to a best measured RS followed by a PUSCH payload (e.g. msgA PUSCH payload) (1350). The gNB may receive msgA and may adjust its spatial transmission filter corresponding to the RSS linked to the detected preamble index. The gNB may send a msgB reply to the WTRU using an adjusted spatial transmission filter. The WTRU may monitor for a msgB response. The msgB response may be scheduled on resources identified by a PDCCH addressed to the WTRU's identity, or on resources that are linked to the RSS. The WTRU may receive the response (e.g. msgB response) based on the adjusted spatial transmission filter (1360).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A wireless transmit/receive unit (WTRU) configured to perform a 2-step random access channel (RACH) procedure, the WTRU comprising:
   a transceiver; and
   a processor, wherein:
   the processor is configured to select a random access preamble having a preamble index;
   the processor is further configured to determine a scrambling sequence for a physical uplink shared channel (PUSCH) transmission, wherein the scrambling sequence for the PUSCH transmission is initialized as a function of a random access-radio network temporary identifier (RA-RNTI) and the preamble index, wherein the RA-RNTI is based on a symbol, a slot, a frequency, and a carrier identifier (ID); and
   the transceiver is configured to send a message to a network node, wherein the message comprises the selected random access preamble and the PUSCH transmission, wherein the PUSCH transmission is scrambled with the determined scrambling sequence that is based on the RA-RNTI and the preamble index.

2. The WTRU of claim 1, wherein the processor is further configured to multiplex a demodulation reference signal (DMRS) sequence with the PUSCH transmission, wherein the DMRS sequence is based on the preamble index.

3. The WTRU of claim 1, wherein the RA-RNTI is common to a plurality of random access preambles configured to a same physical random access channel (PRACH) transmission opportunity.

4. The WTRU of claim 1, wherein a cyclic redundancy check (CRC) associated with the PUSCH transmission is scrambled.

5. The WTRU of claim 1, wherein the random access preamble is selected randomly.

6. The WTRU of claim 1, wherein the RA-RNTI is configured for a subset of WTRUs.

7. The WTRU of claim 1, wherein the transceiver is further configured to receive configuration information, wherein the configuration information indicates an association between random access preambles and synchronization signal blocks (SSBs), wherein the configuration information indicates an association between random access preambles, reference signal (RS) sets, and physical uplink shared channel (PUSCH) resources.

8. The WTRU of claim 1, wherein the message is sent using a first beam.

9. The WTRU of claim 8, wherein:
the transceiver is further configured to receive a plurality of sets of reference signals (RSs) based on the sent message;
the processor is further configured to determine a measurement of the received sets of RSs;
the processor is further configured to select a RS based on the determined measurement of the received sets of RSs; and
the transceiver is further configured to send uplink data on a PUSCH using a second beam.

10. A method implemented by a wireless transmit/receive unit (WTRU) configured to perform a 2-step random access channel (RACH) procedure, the method comprising:
selecting a random access preamble having a preamble index;
determining a scrambling sequence for a physical uplink shared channel (PUSCH) transmission, wherein the scrambling sequence for the PUSCH transmission is initialized as a function of a random access-radio network temporary identifier (RA-RNTI) and the preamble index, wherein the RA-RNTI is based on a symbol, a slot, a frequency, and a carrier identifier (ID); and
sending a message to a network node, wherein the message comprises the selected random access preamble and the PUSCH transmission, wherein the PUSCH transmission is scrambled with the determined scrambling sequence that is based on the RA-RNTI and the preamble index.

11. The method of claim 10, further comprising multiplexing a demodulation reference signal (DMRS) sequence with the PUSCH transmission, wherein the DMRS sequence is based on the preamble index.

12. The method of claim 10, wherein the RA-RNTI is common to a plurality of random access preambles configured to a same physical random access channel (PRACH) transmission opportunity.

13. The method of claim 10, wherein a cyclic redundancy check (CRC) associated with the PUSCH transmission is scrambled.

14. The method of claim 10, wherein the random access preamble is selected randomly.

15. The method of claim 10, wherein the RA-RNTI is configured for a subset of WTRUs.

16. The method of claim 10, further comprising receiving configuration information, wherein the configuration information indicates an association between random access preambles and synchronization signal blocks (SSBs), wherein the configuration information indicates an association between random access preambles, reference signal (RS) sets, and physical uplink shared channel (PUSCH) resources.

17. The method of claim 10, wherein the message is sent using a first beam.

18. The method of claim 17, further comprising:
receiving a plurality of sets of reference signals (RSs) based on the sent message;
determining a measurement of the received sets of RSs;
selecting a RS based on the determined measurement of the received sets of RSs; and
sending uplink data on a PUSCH using a second beam.

* * * * *